US011869447B2

(12) United States Patent
Yoo et al.

(10) Patent No.: US 11,869,447 B2
(45) Date of Patent: Jan. 9, 2024

(54) LIGHT EMITTING DISPLAY DEVICE INCLUDING DATA VOLTAGE OUTPUT CIRCUITS ONE OF WHICH PRE-CHARGES A REFERENCE LINE AND DRIVING METHOD THEREOF

(71) Applicant: LG Display Co., Ltd., Seoul (KR)

(72) Inventors: Jae Ik Yoo, Seoul (KR); Jae Yoon Bae, Seoul (KR); Seok Hyun Hong, Gimpo-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/562,414

(22) Filed: Dec. 27, 2021

(65) Prior Publication Data

US 2022/0208129 A1 Jun. 30, 2022

(30) Foreign Application Priority Data

Dec. 31, 2020 (KR) ........................ 10-2020-0189763

(51) Int. Cl.
*G09G 3/3291* (2016.01)
*G09G 3/00* (2006.01)
*G09G 3/3258* (2016.01)

(52) U.S. Cl.
CPC ........... *G09G 3/3291* (2013.01); *G09G 3/006* (2013.01); *G09G 3/3258* (2013.01); *G09G 2330/12* (2013.01)

(58) Field of Classification Search
None
See application file for complete search history.

(56) References Cited

U.S. PATENT DOCUMENTS

| | | | | |
|---|---|---|---|---|
| 9,035,976 | B2 | 5/2015 | Lee et al. | |
| 9,183,785 | B2 | 11/2015 | Kim | |
| 9,754,536 | B2 | 9/2017 | Chang et al. | |
| 2007/0200819 | A1* | 8/2007 | Song ...................... | G09G 3/344 345/107 |
| 2009/0109201 | A1* | 4/2009 | Kim ..................... | G09G 3/3648 345/206 |
| 2011/0007067 | A1* | 1/2011 | Ryu ..................... | G09G 3/3233 345/76 |

(Continued)

FOREIGN PATENT DOCUMENTS

| | | | |
|---|---|---|---|
| CN | 103578411 | A | 2/2014 |
| CN | 104700773 | A | 6/2015 |

(Continued)

OTHER PUBLICATIONS

Extended European Search Report, European Patent Office Application No. 21218216.6, dated May 30, 2022, 18 pages.

(Continued)

*Primary Examiner* — Kirk W Hermann
(74) *Attorney, Agent, or Firm* — Fenwick & West LLP

(57) ABSTRACT

A light emitting display device includes a display panel configured to display an image, and a data driver including a panel driving circuit and a panel sensing circuit, the panel driving circuit configured to drive the display panel, and the panel sensing circuit configured to sense the display panel.

(Continued)

The data driver pre-charges a reference line of the display panel based on a voltage output from at least one of data voltage output circuits included in the panel driving circuit.

18 Claims, 30 Drawing Sheets

(56) References Cited

U.S. PATENT DOCUMENTS

| | | | | |
|---|---|---|---|---|
| 2014/0022289 | A1 | 1/2014 | Lee et al. | |
| 2014/0176622 | A1* | 6/2014 | Jung | G09G 3/3233 345/76 |
| 2015/0154913 | A1 | 6/2015 | Kim | |
| 2016/0042690 | A1 | 2/2016 | Chang et al. | |
| 2016/0062548 | A1* | 3/2016 | Kwon | G06T 1/20 345/82 |
| 2017/0132979 | A1* | 5/2017 | Oh | G09G 3/3275 |
| 2017/0287429 | A1* | 10/2017 | Kong | G09G 3/3685 |
| 2017/0309219 | A1* | 10/2017 | Kong | G09G 3/2003 |
| 2018/0061296 | A1* | 3/2018 | Shim | G09G 3/3258 |
| 2018/0190192 | A1* | 7/2018 | Kwon | G09G 3/3233 |
| 2020/0175919 | A1 | 6/2020 | Hong et al. | |
| 2021/0407349 | A1* | 12/2021 | Choi | G09G 3/3614 |

FOREIGN PATENT DOCUMENTS

| | | | |
|---|---|---|---|
| CN | 105374320 | A | 3/2016 |
| JP | 2014-126873 | A | 7/2014 |
| JP | 2020-086440 | A | 6/2020 |
| KR | 102363842 | B1 * | 12/2008 |
| KR | 10-2016-0078640 | A | 7/2016 |
| KR | 10-2016-0141266 | A | 12/2016 |
| KR | 10-2017-0081049 | A | 7/2017 |
| KR | 10-2017-0081094 | A | 7/2017 |
| KR | 10-2020-0069701 | A | 6/2020 |
| KR | 20160007806 | A * | 10/2020 |

OTHER PUBLICATIONS

Japan Patent Office, Office Action, JP Patent Application No. 2021-214617, dated Dec. 6, 2022, eight pages.

China National Intellectual Property Administration, Notice of Allowance, Chinese Patent Application No. 202111659709.9, dated Nov. 10, 2023, seven pages.

* cited by examiner

LIGHT EMITTING DISPLAY DEVICE INCLUDING DATA VOLTAGE OUTPUT CIRCUITS ONE OF WHICH PRE-CHARGES A REFERENCE LINE AND DRIVING METHOD THEREOF

CROSS-REFERENCE TO RELATED APPLICATION

This application claims the benefit of Republic of Korea Patent Application No. 10-2020-0189763, filed on Dec. 31, 2020, which is hereby incorporated by reference in its entirety.

BACKGROUND

Field of Technology

The present disclosure relates to a light emitting display device and a driving method thereof.

Discussion of the Related Art

With the development of information technology, the market for display devices that are media for connection between users and information is growing. Accordingly, display devices such as a light emitting display (LED), a quantum dot display (QDD), and a liquid crystal display (LCD) have been increasingly used.

The above display devices each include a display panel including sub-pixels, a driver which outputs a driving signal for driving of the display panel, and a power supply which generates power to be supplied to the display panel or the driver.

In such a display device, when sub-pixels formed in a display panel are supplied with driving signals, for example, a scan signal and a data signal, a selected one thereof may transmit light therethrough or directly emit light, thereby displaying an image.

SUMMARY

Accordingly, the present disclosure is directed to a light emitting display device and a driving method thereof that substantially obviate one or more problems due to limitations and disadvantages of the related art.

An object of the present disclosure is to shorten not only a sensing time of a display panel but also a compensation time thereof based on reduction in time of source following performed during sensing.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the disclosure, as embodied and broadly described herein, a light emitting display device includes a display panel configured to display an image, and a data driver including a panel driving circuit and a panel sensing circuit, the panel driving circuit configured to drive the display panel, and the panel sensing circuit configured to sense the display panel, wherein the data driver pre-charges a reference line of the display panel based on a voltage output from at least one of data voltage output circuits included in the panel driving circuit.

In another aspect of the present disclosure, there is provided a method of driving a light emitting display device which includes a display panel configured to display an image, and a data driver having a panel driving circuit configured to drive the display panel, and a panel sensing circuit configured to sense the display panel. The method includes applying a sensing voltage to a data line of a sub-pixel of a plurality of subpixels to be sensed and a black data voltage to a data line of a sub-pixel of a plurality of subpixels that is not to be sensed, to sense the display panel, and applying a pre-charge voltage to a reference line of the sub-pixel to be sensed, wherein the pre-charge voltage is a voltage output from at least one of data voltage output circuits included in the panel driving circuit.

In one embodiment, a light emitting display device comprises: a display panel configured to display an image, the display panel including a plurality of sub-pixels, a reference line connected to the plurality of subpixels, and a plurality of data lines, each of the plurality of data lines connected to a corresponding one of the plurality of sub-pixels; and a data driver comprising a plurality of data voltage output circuits configured to drive the display panel via the plurality of data lines and a panel sensing circuit configured to sense the display panel through the reference line, each of the plurality of data voltage output circuits connected to a corresponding one of the data lines, wherein a first data voltage output circuit from the plurality of data voltage output circuits is configured to output a sensing voltage to a data line connected to a first sub-pixel from the plurality of sub-pixels that corresponds to the first data voltage output circuit, and a second data voltage output circuit from the plurality of data voltage output circuits is configured to output a pre-charge voltage to the reference line that is applied to a sensing node of the first sub-pixel while the sensing voltage is applied to the first sub-pixel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

A display device according to the present disclosure may be implemented as a television, a video player, a personal computer (PC), a home theater, an automotive electric device, or a smartphone, but is not limited thereto. The display device according to the present invention may be implemented by a light emitting display (LED), a quantum dot display (QDD), or a liquid crystal display (LCD). For convenience of description, an LED device that directly emits light based on an inorganic light emitting diode or an organic light emitting diode will hereinafter be taken as an example of the display device according to the present invention.

Figure 1:
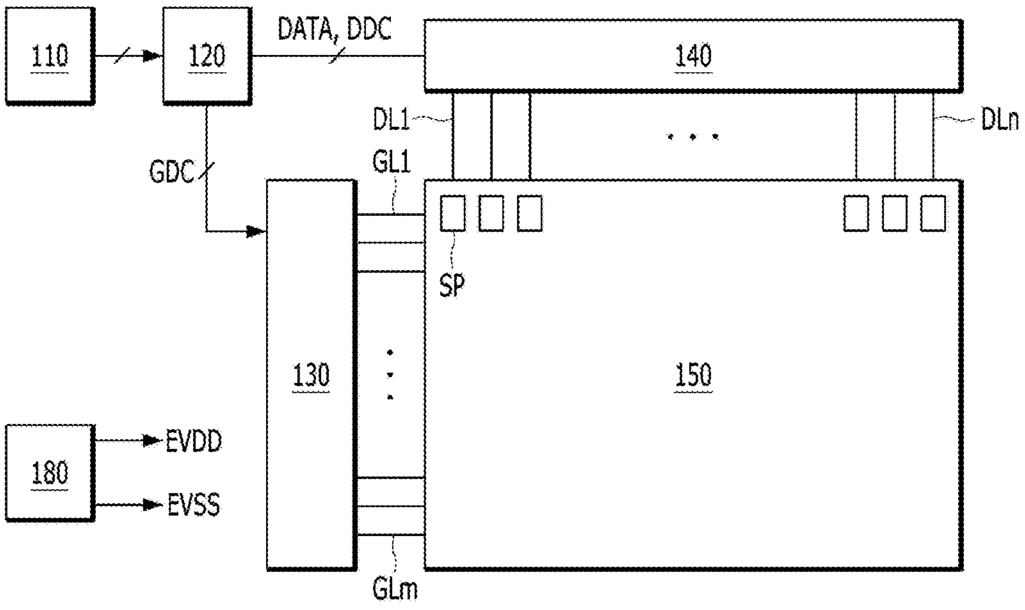
FIG. 1 is a block diagram schematically showing the configuration of a light emitting display (LED) device.
Figure 2:
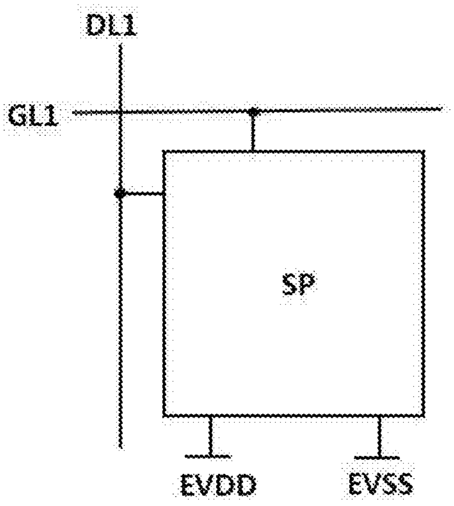
FIG. 2 is a schematic block diagram of a sub-pixel shown in FIG. 1 according to one embodiment.

FIG. 1 is a block diagram schematically showing the configuration of an LED device, and FIG. 2 is a schematic block diagram of a sub-pixel shown in FIG. 1 according to one embodiment.

As shown in FIGS. 1 and 2, the LED device may include an image supply 110, a timing controller 120, a scan driver 130, a data driver 140, a display panel 150, and a power supply 180.

The image supply (set or host system) 110 may output various driving signals together with an image data signal externally supplied or an image data signal stored in an internal memory. The image supply 110 may supply the data signal and the various driving signals to the timing controller 120.

The timing controller 120 may output a gate timing control signal GDC for control of operation timing of the scan driver 130, a data timing control signal DDC for control of operation timing of the data driver 140, and various synchronization signals (a vertical synchronization signal Vsync and a horizontal synchronization signal Hsync). The timing controller 120 may supply a data signal DATA supplied from the image supply 110 together with the data timing control signal DDC to the data driver 140. The timing controller 120 may be formed in the form of an integrated circuit (IC) and mounted on a printed circuit board, but is not limited thereto.

The scan driver 130 may output a scan signal (or scan voltage) in response to the gate timing control signal GDC supplied from the timing controller 120. The scan driver 130 may supply the scan signal to sub-pixels included in the display panel 150 through gate lines GL1 to GLm. The scan driver 130 may be formed in the form of an IC or may be formed directly on the display panel 150 in a gate-in-panel (GIP) manner, but is not limited thereto.

The data driver 140 may sample and latch the data signal DATA in response to the data timing control signal DDC supplied from the timing controller 120, convert the resulting digital data signal into an analog data voltage based on a gamma reference voltage, and output the converted analog data voltage. The data driver 140 may supply the data voltage to the sub-pixels included in the display panel 150 through data lines DL1 to DLn. The data driver 140 may be formed in the form of an IC and mounted on the display panel 150 or mounted on the printed circuit board, but is not limited thereto.

The power supply 180 may generate a first voltage of a high level and a second voltage of a low level based on an external input voltage externally supplied and output the generated first voltage and second voltage through a first voltage line EVDD and a second voltage line EVSS, respectively. The power supply 180 may generate and output a voltage (for example, a gate voltage including a gate high voltage and a gate low voltage) required to drive the scan driver 130 or a voltage (for example, a drain voltage including a drain voltage and a half-drain voltage) required to drive the data driver 140, as well as the first voltage and the second voltage.

The display panel 150 may display an image in response to a driving signal including the scan signal and the data voltage, the first voltage, and the second voltage. The sub-pixels of the display panel 150 directly emit light. The display panel 150 may be manufactured based on a rigid or flexible substrate of glass, silicon, polyimide, or the like. The sub-pixels which emit light may include red, green and blue sub-pixels or may include red, green, blue and white sub-pixels, but not limited thereto. For example, the sub-pixels may include magenta, yellow and cyan sub-pixels, or other combination of sub-pixels.

For example, one sub-pixel SP may be connected to the first data line DL1, the first gate line GL1, the first voltage line EVDD, and the second voltage line EVSS, and may include a pixel circuit which is composed of a switching transistor, a driving transistor, a capacitor, an organic light emitting diode, etc. The sub-pixel SP used in the LED device is complex in circuit configuration in that it directly emits light. Furthermore, there are various compensation circuits for compensating for deterioration of not only the organic light emitting diode, which emits light, but also the driving transistor, which supplies driving current to the organic light emitting diode. In this regard, it should be noted that the sub-pixel SP is simply shown in block form.

On the other hand, the timing controller 120, the scan driver 130, the data driver 140, etc., have been described as if they have individual configurations. However, one or more of the timing controller 120, the scan driver 130 and the data driver 140 may be integrated into one IC depending on a method of implementation of the LED device.

Figure 3A:
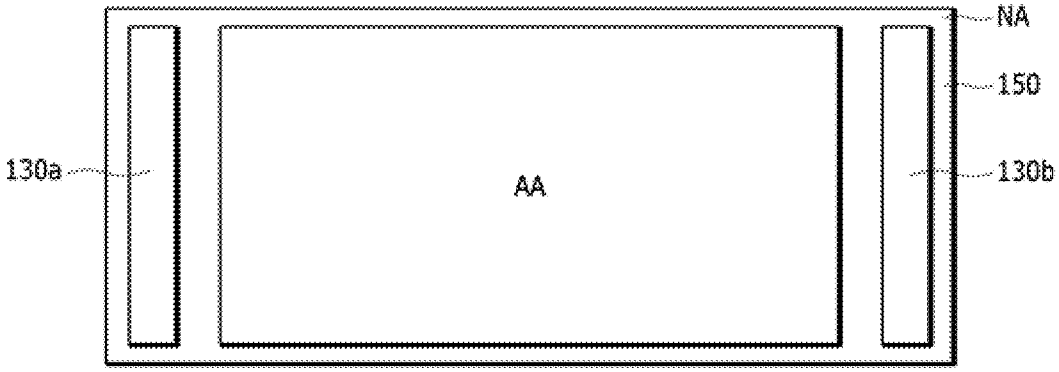
FIGS. 3A and 3B are views showing examples of layouts of a gate-in-panel (GIP)-type scan driver.
Figure 3B:
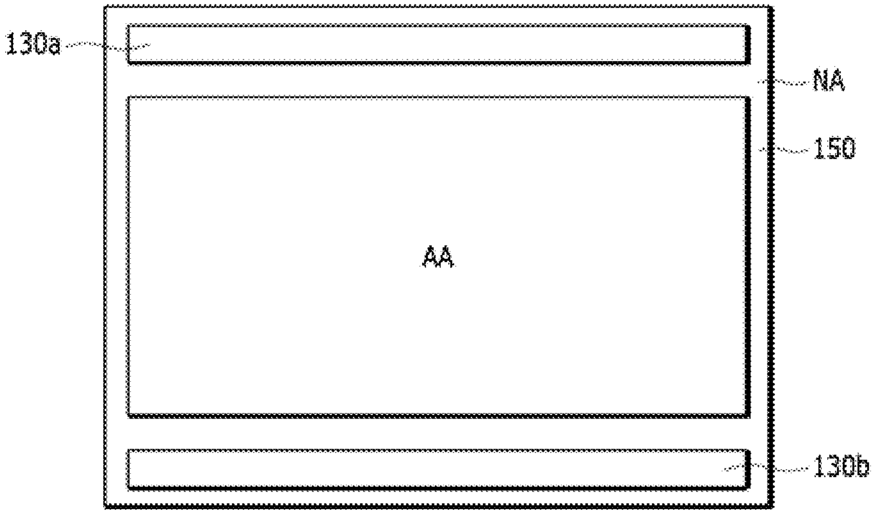
Figure 4:
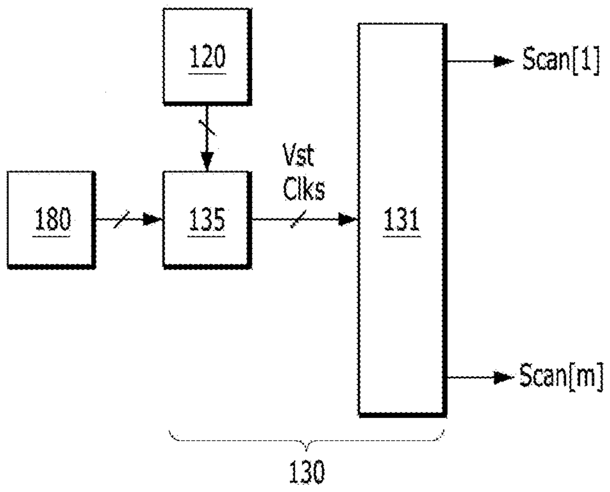
FIGS. 4 and 5 are block diagrams showing examples of the configurations of devices associated with the GIP-type scan driver according to one embodiment.
Figure 5:
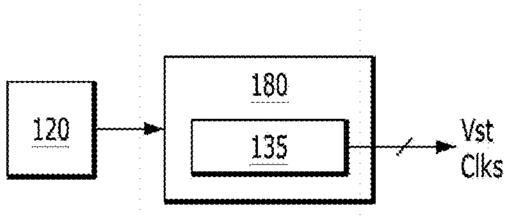

FIGS. 3A and 3B are views showing examples of the layout of a GIP-type scan driver, and FIGS. 4 and 5 are block diagrams showing examples of the configurations of devices associated with the GIP-type scan driver according to one embodiment.

As shown in FIGS. 3A and 3B, GIP-type scan drivers 130*a* and 130*b* are disposed in a non-active area NA of the display panel 150. The scan drivers 130*a* and 130*b* may be disposed at the left and right parts of the non-active area NA of the display panel 150 as in FIG. 3A. Alternatively, the scan drivers 130*a* and 130*b* may be disposed at the upper and lower parts of the non-active area NA of the display panel 150 as in FIG. 3B.

Although the scan drivers 130*a* and 130*b* have been shown and disclosed as an example as being disposed in the non-active area NA at the left and right sides or the upper and lower sides of an active area AA, they may be disposed in the non-active area NA at only one of the left side, right side, upper side and lower side of the active area AA.

As shown in FIG. 4, the GIP-type scan driver 130 may include a shift register 131 and a level shifter 135. The level shifter 135 may generate clock signals Clks and a start signal Vst based on signals and voltages output from the timing controller 120 and power supply 180. The clock signals Clks may be generated in the form of K different phases (where K is an integer which is greater than or equal to 2), such as two phases, four phases, and eight phases.

The shift register 131 may operate based on the signals Clks and Vst output from the level shifter 135 and output scan signals Scan[1] to Scan[m] capable of turning on or off transistors formed in the display panel. The shift register 131 may be formed on the display panel in the form of a thin film in a GIP manner. In this regard, a portion of the scan driver 130 formed on the display panel may be the shift register 131. The scan drivers 130*a* and 130*b* in FIG. 3 may correspond to the shift register 131.

As shown in FIGS. 4 and 5, unlike the shift register 131, the level shifter 135 may be independently formed in the form of an IC or may be included in the power supply 180. However, this is merely one example, and the level shifter 135 is not limited thereto.

Figure 6:
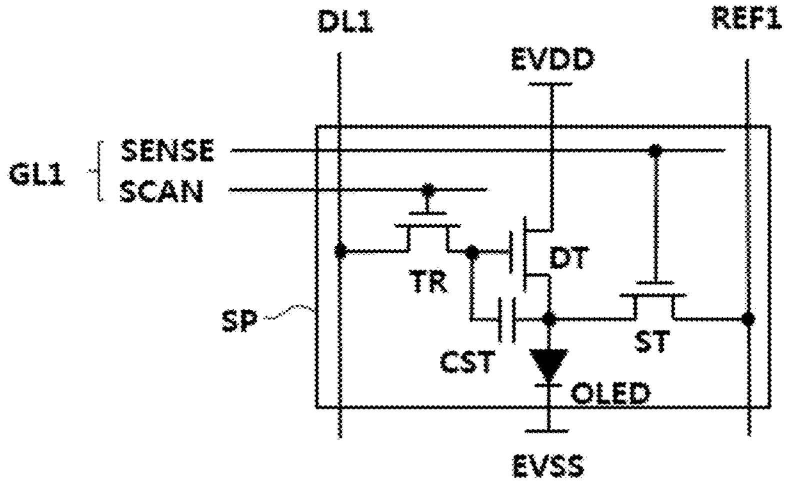
FIG. 6 is a circuit diagram of a sub-pixel with a compensation circuit.
Figure 7:
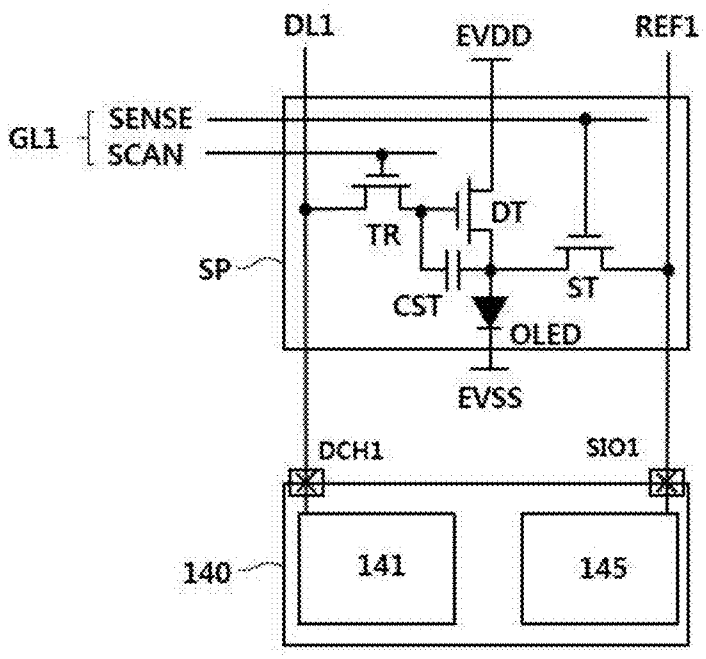
FIG. 7 is a schematic view of the sub-pixel of FIG. 6 and a data driver.
Figure 8:
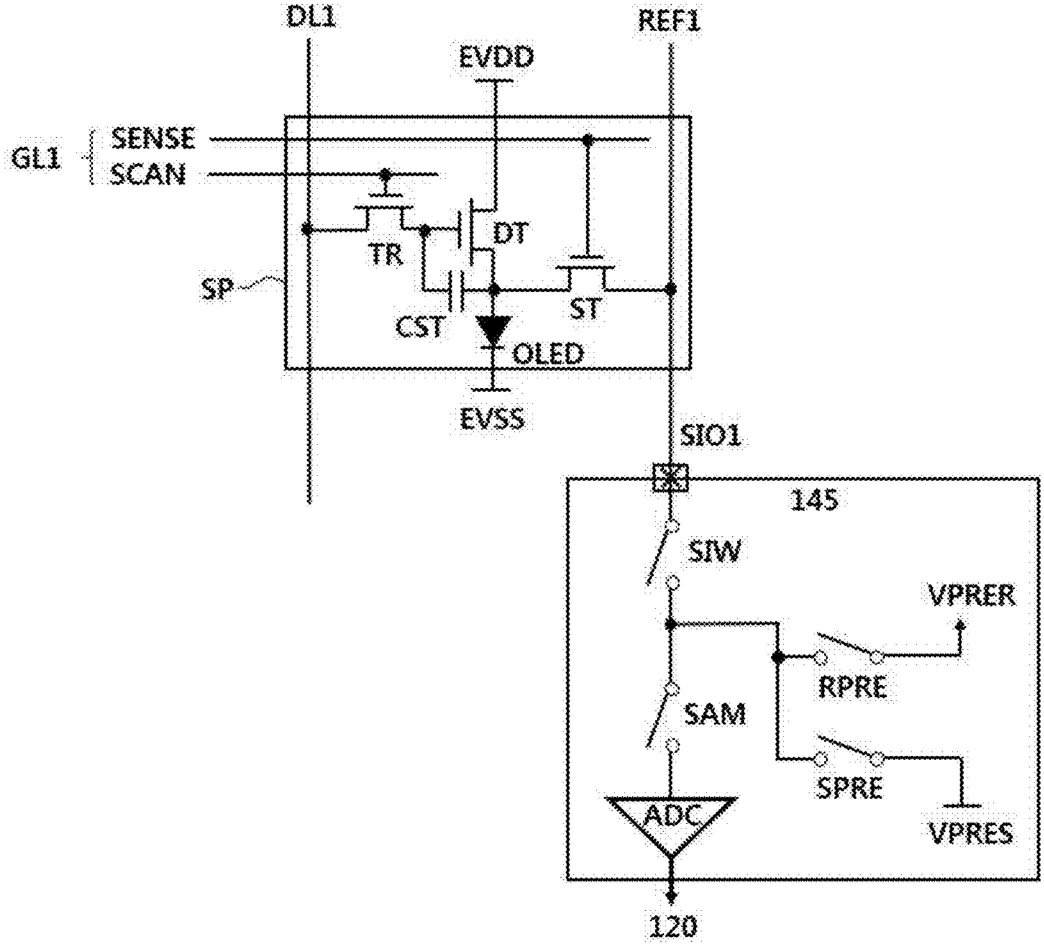
FIG. 8 is a detailed circuit diagram of a panel sensing circuit in FIG. 7 according to one embodiment.

FIG. 6 is a circuit diagram of a sub-pixel with a compensation circuit, FIG. 7 is a schematic view of the sub-pixel of FIG. 6 and the data driver, and FIG. 8 is a detailed circuit diagram of a panel sensing circuit in FIG. 7 according to one embodiment.

As shown in FIG. 6, one sub-pixel SP may include a switching transistor TR, a driving transistor DT, a sensing transistor ST, a capacitor CST, and an organic light emitting diode OLED.

The driving transistor DT may have a gate electrode connected to a first electrode of the capacitor CST, a first electrode connected to the first voltage line EVDD, and a second electrode connected to an anode electrode of the organic light emitting diode OLED. The capacitor CST may have the first electrode connected to the gate electrode of the driving transistor DT and a second electrode connected to the anode electrode of the organic light emitting diode OLED. The organic light emitting diode OLED may have the anode electrode connected to the second electrode of the driving transistor DT and a cathode electrode connected to the second voltage line EVSS.

The switching transistor TR may have a gate electrode connected to a scan line SCAN included in the first gate line GL1, a first electrode connected to the first data line DL1, and a second electrode connected to the gate electrode of the driving transistor DT. The switching transistor TR may be turned on in response to a scan signal transferred through the scan line SCAN.

The sensing transistor ST may have a gate electrode connected to a sense line SENSE included in the first gate line GL1, a first electrode connected to a first reference line REF1, and a second electrode connected to the anode electrode of the organic light emitting diode OLED. The sensing transistor ST may be turned on in response to a sense signal transferred through the sense line SENSE.

The sensing transistor ST is a type of compensation circuit which is additionally provided to compensate for deterioration (in a threshold voltage or the like) of the driving transistor DT or organic light emitting diode OLED. The sensing transistor ST may enable physical threshold voltage sensing based on a source follower operation of the driving transistor DT. The sensing transistor ST may operate to acquire a sensed voltage through a sensing node defined between the driving transistor DT and the organic light emitting diode OLED.

On the other hand, although the first gate line GL1 may be divided into two gate lines as an example, the two gate lines may be integrated into one gate line. That is, the switching transistor TR and the sensing transistor ST may be connected in common to the first gate line GL1 and be turned on or off at the same time.

As shown in FIG. 7, the data driver 140 may include a panel driving circuit 141 configured to drive the sub-pixel SP, and a panel sensing circuit 145 configured to sense the sub-pixel SP. The panel driving circuit 141 may be connected to the first data line DL1 through a first data channel DCH1 and connected to the first reference line REF1 through a first sensing channel SIO1. The panel driving circuit 141 may output a data voltage for driving of the sub-pixel SP through the first data channel DCH1. The panel sensing circuit 145 may acquire a sensed voltage from the sub-pixel SP through the first sensing channel SIO1.

As shown in FIG. 8, the panel sensing circuit 145 may include a first voltage circuit SPRE, a second voltage circuit RPRE, a sensing controller SIW, a sampling circuit SAM, and an analog-to-digital converter ADC.

Each of the first voltage circuit SPRE and the second voltage circuit RPRE may act to output a corresponding one of a first reference voltage from a first reference voltage source VPRES and a second reference voltage from a second reference voltage source VPRER to initialize a node or circuit included in the sub-pixel SP or apply a specific voltage thereto. The first reference voltage may be defined as a voltage for use in a sensing mode (compensation mode) for deterioration compensation, and the second reference voltage may be defined as a voltage for use in a driving mode (normal mode) for image display. The first reference voltage may be set to a voltage lower than the second reference voltage, but is not limited thereto.

The sensing controller SIW may perform a switching operation for outputting any one of the first reference voltage and second reference voltage through the first sensing channel SIO1 or acquiring a sensed voltage through the first reference line REF1. Although the sensing controller SIW is shown in the form of a switch, it may be omitted depending on a sensing method or may be implemented by a device (multiplexer) capable of being driven in a time division manner.

The sampling circuit SAM may operate with the sensing controller SIW to perform a sampling operation for acquiring a sensed voltage through the first reference line REF1. The analog-to-digital converter ADC may convert an analog sensed voltage acquired by the sampling circuit SAM into a digital sensed voltage and output the converted digital sensed voltage.

As stated above, the panel sensing circuit 145 may acquire a sensed voltage for compensation for deterioration of the driving transistor DT or organic light emitting diode OLED included in the sub-pixel SP through the first reference line REF1 and output the acquired sensed voltage. The sensed voltage output from the panel sensing circuit 145 may be transferred to the timing controller 120. The timing controller 120 may determine based on the sensed voltage whether the driving transistor DT or organic light emitting diode OLED included in the sub-pixel SP has been deteriorated and perform a compensation operation for compensating for the deterioration.

Figure 9:
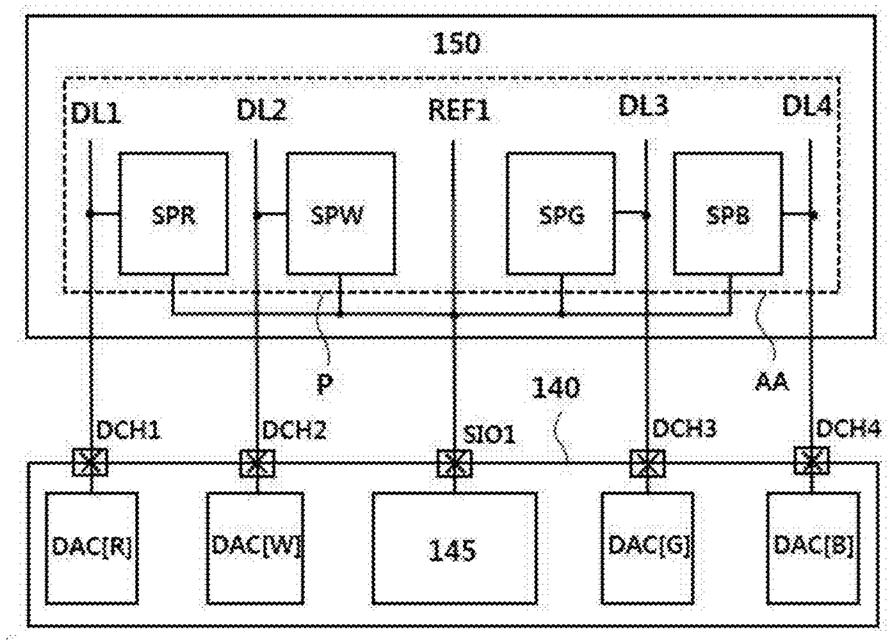
FIG. 9 is a block diagram of an LED device according to a first embodiment of the present disclosure.
Figure 12:
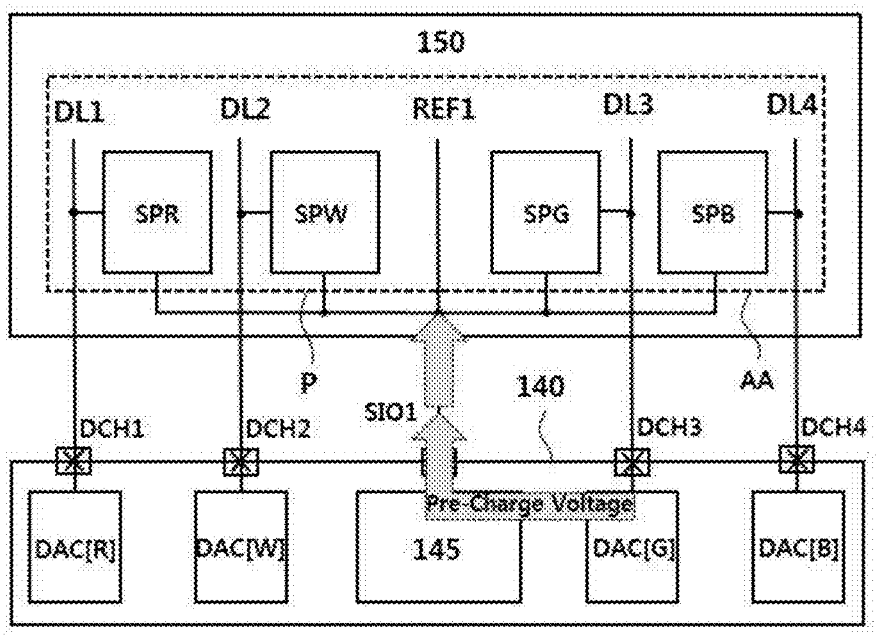
Figure 13:
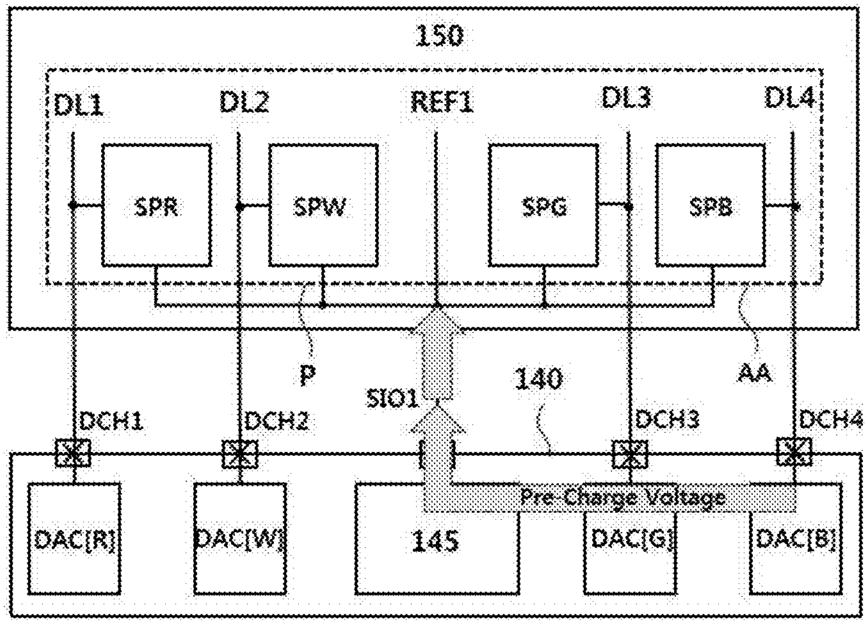
Figure 14:
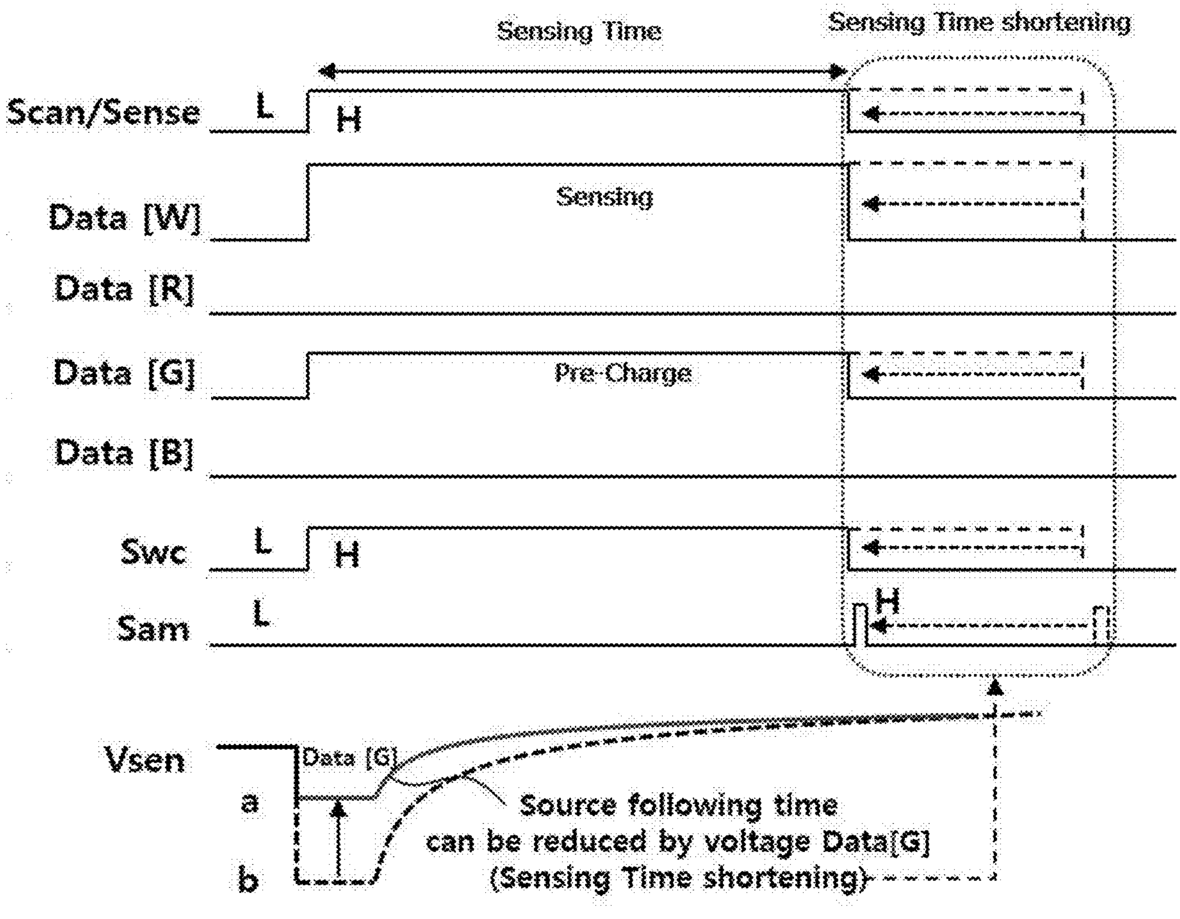
FIG. 14 is a view illustrating advantages of the first embodiment of the present disclosure.

FIG. 9 is a block diagram of an LED device according to a first embodiment of the present disclosure, FIGS. 10 to 13 are views illustrating a part of a sensing operation of the LED device according to the first embodiment of the present disclosure, and FIG. 14 is a view illustrating advantages of the first embodiment of the present disclosure.

The panel driving circuit 141 will hereinafter be described as an example including four data voltage output units (or data voltage output circuits) including a first data voltage output unit, a second data voltage output unit, a third data voltage output unit and a fourth data voltage output unit, as shown in FIG. 9, but is not limited thereto. However, it will hereinafter be described as an example that one pixel P includes a red sub-pixel SPR, a white sub-pixel SPW, a green sub-pixel SPG, and a blue sub-pixel SPB, and, corresponding thereto, the data voltage output units of the panel driving circuit 141 include a red data voltage output unit DAC[R], a white data voltage output unit DAC[W], a green data voltage output unit DAC[G], and a blue data voltage output unit DAC[B].

The red data voltage output unit DAC[R] may output a red data voltage through the first data channel DCH1. The red data voltage may be applied to the red sub-pixel SPR connected to the first data line DLL The white data voltage output unit DAC[W] may output a white data voltage through a second data channel DCH2. The white data voltage may be applied to the white sub-pixel SPW connected to the second data line DL2. The green data voltage output unit DAC[G] may output a green data voltage through a third data channel DCH3. The green data voltage may be applied to the green sub-pixel SPG connected to the third data line DL3. The blue data voltage output unit DAC[B] may output a blue data voltage through a fourth data channel DCH4. The blue data voltage may be applied to the blue sub-pixel SPB connected to the fourth data line DL4.

The red sub-pixel SPR, the white sub-pixel SPW, the green sub-pixel SPG and the blue sub-pixel SPB may be separately connected to the first data line DL1, the second data line DL2, the third data line DL3 and the fourth data line DL4, respectively. However, the red sub-pixel SPR, the white sub-pixel SPW, the green sub-pixel SPG and the blue sub-pixel SPB may be connected in common to the first reference line REF1 to share the first reference line REF1.

That is, a total of four sub-pixels SPR, SPW, SPG and SPB included in one pixel P may have a structure connected to the panel sensing circuit 145 of the data driver 140 through one first reference line REF1. By virtue of this structure, each of the total four sub-pixels SPR, SPW, SPG and SPB included in one pixel P may be compensated for deterioration (in a threshold voltage or the like).

On the other hand, the panel sensing circuit 145 may acquire a sensed voltage from a selected one of the red sub-pixel SPR, the white sub-pixel SPW, the green sub-pixel SPG and the blue sub-pixel SPB through the first reference line REF1, as will hereinafter be described.

As shown in FIGS. 10 to 13, the panel sensing circuit 145 may apply a pre-charge voltage through the first sensing channel SIO1. The pre-charge voltage may be output through the first sensing channel SIO1 and then applied to a sensing node of a sub-pixel to be sensed. The pre-charge voltage is a voltage for pre-charging (boosting) a sensing node of a selected sub-pixel to a voltage of a specific level during a sensing operation of the panel sensing circuit 145.

Figure 10:
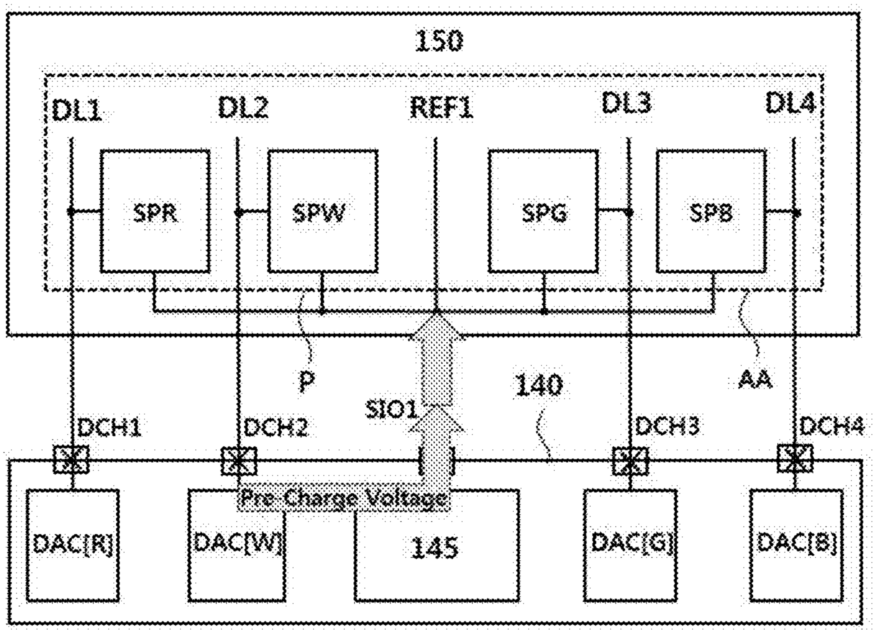
FIGS. 10 to 13 are views illustrating a part of a sensing operation of the LED device according to the first embodiment of the present disclosure.
Figure 11:
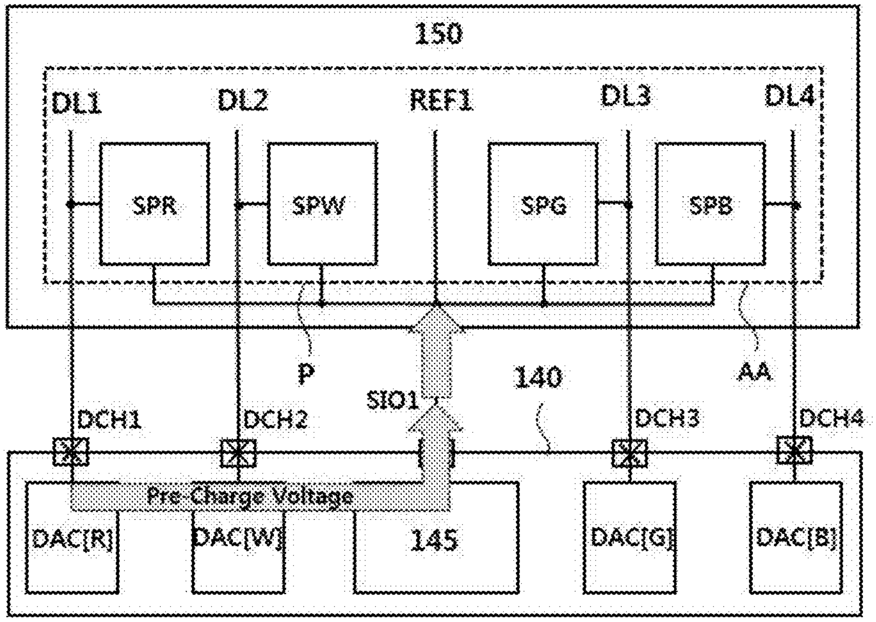

The pre-charge voltage may be output from the white data voltage output unit DAC[W] as in FIG. 10, output from the red data voltage output unit DAC[R] as in FIG. 11, output from the green data voltage output unit DAC[G] as in FIG. 12, or output from the blue data voltage output unit DAC[B] as in FIG. 13. That is, the pre-charge voltage may not be applied from an internal voltage source or an external voltage source, but be output from one of the data voltage output units DAC[W], DAC[R], DAC[G] and DAC[B].

Hereinafter, advantages of the first embodiment of the present disclosure will be described with reference to an example of, during the sensing operation of the panel sensing circuit 145, applying the pre-charge voltage output from the green data voltage output unit DAC[G] to the white sub-pixel SPW and acquiring a sensed voltage from the white sub-pixel SPW.

As shown in FIGS. 8, 9, 12 and 14, a scan signal Scan and a sense signal Sense may be applied as logic high H for a sensing time to sense the white sub-pixel SPW. Upon application of the scan signal Scan and sense signal Sense of logic high H, the switching transistor TR and sensing transistor ST included in the white sub-pixel SPW may be turned on.

The panel sensing circuit 145 may drive the green data voltage output unit DAC[G] for the sensing time to output the pre-charge voltage. The pre-charge voltage output from the green data voltage output unit DAC[G] may be applied to the white sub-pixel SPW.

The pre-charge voltage may be applied to the white sub-pixel SPW through a turned-on switch for the sensing time. For example, the switch which transfers the pre-charge voltage may be turned on by a switch control signal Swc which is applied as logic high H for the sensing time. Alternatively, the switch may be turned on by the switch control signal Swc of logic low L.

The panel driving circuit 141 may drive the white data voltage output unit DAC[W] for the sensing time to output a sensing voltage. The pre-charge voltage may have a level lower than that of the sensing voltage.

Upon receiving the sensing voltage and the pre-charge voltage through the switching transistor TR and the sensing transistor ST turned on by the scan signal Scan and the sense signal Sense, the white sub-pixel SPW may enter a sensing enable state.

Upon completion of the sensing time, the scan signal Scan, the sense signal Sense and the switch control signal Swc may be changed to logic low L. When the scan signal Scan, the sense signal Sense and the switch control signal Swc are changed to logic low L, a sampling signal Sam may be changed from logic low L to logic high H.

When the sampling signal Sam is changed from logic low L to logic high H, the sampling circuit SAM may perform a sampling operation for acquiring a sensed voltage Vsen through the white sub-pixel SPW connected to the first reference line REF1.

As can be seen by referring to a variation in sensed voltage Vsen, the first embodiment of the present disclosure uses the pre-charge voltage output through the green data voltage output unit DAC[G] instead of a reference voltage applied from an external voltage source or an internal voltage source.

A baseline of the sensed voltage Vsen may be set to "a" higher in level than "b" owing to "Data[G]", which is the pre-charge voltage. Raising the baseline of the sensed voltage Vsen may make it possible to reduce time of source following of the driving transistor DT for sensing of the white sub-pixel SPW.

Provided that the time of source following of the driving transistor DT is reduced in this manner, the sensing time for sensing of the sub-pixel will be shortened. Although the sensing time may be shortened by the voltage Data[G] which is the pre-charge voltage (i.e., by the level of the pre-charge voltage), the pre-charge voltage is set to be lower than the sensing voltage for a source following operation of the driving transistor DT in one embodiment.

Hereinafter, a detailed description will be given of the configuration and operation of a device for applying a pre-charge voltage output from a specific data voltage output unit to a specific sub-pixel during the sensing operation of the panel sensing circuit 145. Notably, in the following description, parts specifically shown or changed compared to the first embodiment will be mainly described.

Figure 15:
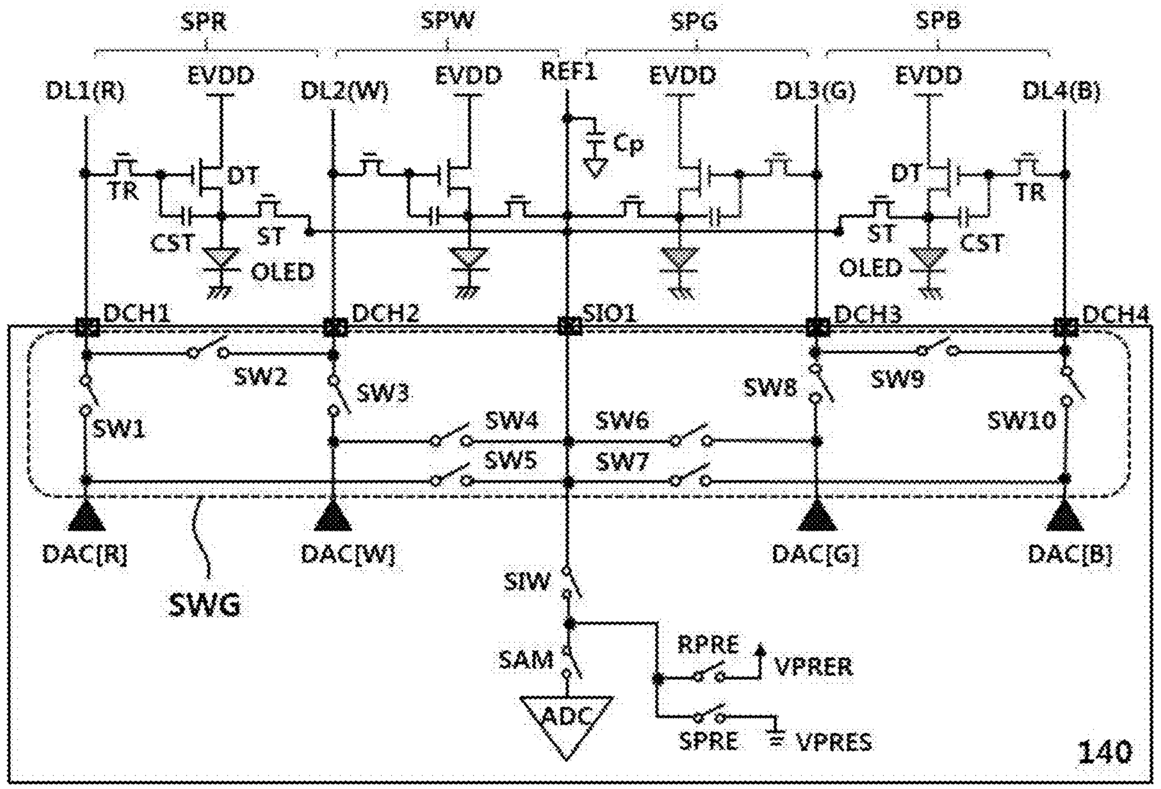
FIG. 15 is a circuit diagram of an LED device according to a second embodiment of the present disclosure.
Figure 16:
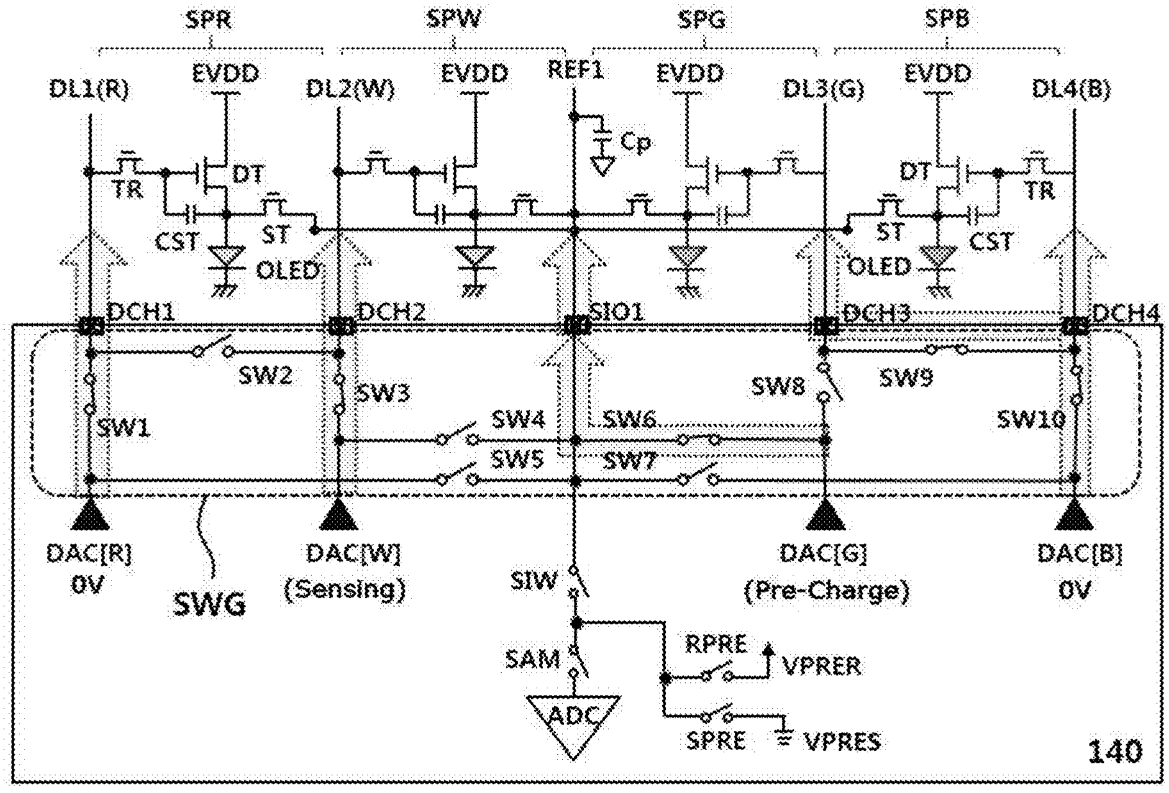
FIGS. 16 and 17 are views illustrating a part of a sensing operation of the LED device according to the second embodiment of the present disclosure.
Figure 17:
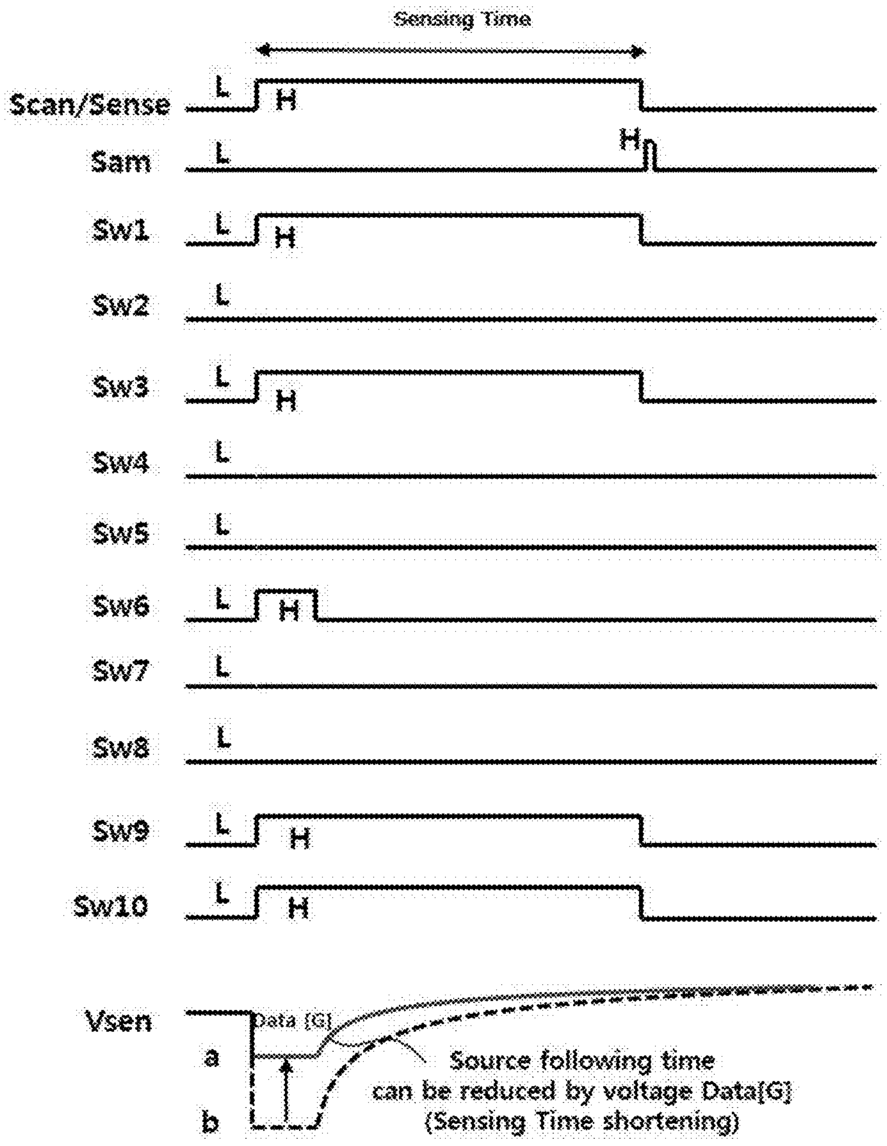

FIG. 15 is a circuit diagram of an LED device according to a second embodiment of the present disclosure, and FIGS. 16 and 17 are views illustrating a part of a sensing operation of the LED device according to the second embodiment of the present disclosure.

As shown in FIG. 15, the data driver 140 may include a switch group SWG including first to tenth switches SW1 to SW10. The switch group SWG may perform a switching operation for transferring a voltage output from one of the red data voltage output unit DAC[R], the white data voltage output unit DAC[W], the green data voltage output unit DAC[G] and the blue data voltage output unit DAC[B] to a channel thereof or another channel.

In the second embodiment of the present disclosure, because the pre-charge voltage output from one of the data voltage output units DAC[R], DAC[W], DAC[G] and DAC[B] is transferred to the first sensing channel SIO1, a total of ten switches SW1 to SW10 may constitute the switch group SWG.

The first switch SW1 may have a first electrode connected to an output terminal of the red data voltage output unit DAC[R], a second electrode connected to the first data channel DCH1, and a control electrode connected to a first switch control line to which a first switch control signal is transferred. The first switch SW1 may act to transfer a voltage output from the red data voltage output unit DAC[R] to the first data channel DCH1. Because the first switch SW1 acts to transfer the voltage output from the red data voltage output unit DAC[R] to the first data channel DCH1, it may operate in an image display time for driving of the display panel and a sensing time for sensing of the display panel. A switch which performs a switching operation to output a voltage through a data channel thereof, such as the first switch SW1, may be defined as a voltage output switch.

The second switch SW2 may have a first electrode connected to the first data channel DCH1, a second electrode connected to the second data channel DCH2, and a control electrode connected to a second switch control line to which a second switch control signal is transferred. The second switch SW2 may act to transfer a voltage output from the red data voltage output unit DAC[R] to the second data channel DCH2 or transfer a voltage output from the white data voltage output unit DAC[W] to the first data channel DCH1. That is, the second switch SW2 may act to help voltage sharing such that, when one of the red data voltage output unit DAC[R] and the white data voltage output unit DAC[W] adjacent to each other is driven to output the pre-charge voltage, the other one can apply a black data voltage or a sensing voltage instead. A switch which performs a switching operation such that a voltage is output not through a data channel thereof but through another data channel, such as the second switch SW2, may be defined as a voltage sharing switch.

The third switch SW3 may have a first electrode connected to an output terminal of the white data voltage output unit DAC[W], a second electrode connected to the second data channel DCH2, and a control electrode connected to a third switch control line to which a third switch control signal is transferred. The third switch SW3 may act to transfer a voltage output from the white data voltage output unit DAC[W] to the second data channel DCH2. Because the third switch SW3 acts to transfer the voltage output from the white data voltage output unit DAC[W] to the second data channel DCH2, it may operate in the image display time for driving of the display panel and the sensing time for sensing of the display panel.

The fourth switch SW4 may have a first electrode connected to the output terminal of the white data voltage output unit DAC[W], a second electrode connected to the first sensing channel SIO1, and a control electrode connected to a fourth switch control line to which a fourth switch control signal is transferred. The fourth switch SW4 may act to transfer a voltage output from the white data voltage output unit DAC[W] to the first sensing channel SIO1. Because the fourth switch SW4 acts to transfer the voltage output from the white data voltage output unit DAC[W] to the first sensing channel SIO1, it may operate in the sensing time for sensing of the display panel. A switch which performs a switching operation such that a voltage is output not through a data channel thereof but through a sensing channel, such as the fourth switch SW4, may be defined as a pre-charging switch.

The fifth switch SW5 may have a first electrode connected to the output terminal of the red data voltage output unit DAC[R], a second electrode connected to the first sensing channel SIO1, and a control electrode connected to a fifth switch control line to which a fifth switch control signal is transferred. The fifth switch SW5 may act to transfer a voltage output from the red data voltage output unit DAC[R] to the first sensing channel SIO1. Because the fifth switch SW5 acts to transfer the voltage output from the red data voltage output unit DAC[R] to the first sensing channel SIO1, it may operate in the sensing time for sensing of the display panel.

The sixth switch SW6 may have a first electrode connected to an output terminal of the green data voltage output unit DAC[G], a second electrode connected to the first sensing channel SIO1, and a control electrode connected to a sixth switch control line to which a sixth switch control signal is transferred. The sixth switch SW6 may act to transfer a voltage output from the green data voltage output unit DAC[G] to the first sensing channel SIO1. Because the sixth switch SW6 acts to transfer the voltage output from the green data voltage output unit DAC[G] to the first sensing channel SIO1, it may operate in the sensing time for sensing of the display panel.

The seventh switch SW7 may have a first electrode connected to an output terminal of the blue data voltage output unit DAC[B], a second electrode connected to the first sensing channel SIO1, and a control electrode connected to a seventh switch control line to which a seventh switch control signal is transferred. The seventh switch SW7 may act to transfer a voltage output from the blue data voltage output unit DAC[B] to the first sensing channel SIO1. Because the seventh switch SW7 acts to transfer the voltage output from the blue data voltage output unit DAC [B] to the first sensing channel SIO1, it may operate in the sensing time for sensing of the display panel.

The eighth switch SW8 may have a first electrode connected to the output terminal of the green data voltage output unit DAC[G], a second electrode connected to the third data channel DCH3, and a control electrode connected to an eighth switch control line to which an eighth switch control signal is transferred. The eighth switch SW8 may act to transfer a voltage output from the green data voltage output unit DAC[G] to the third data channel DCH3. Because the eighth switch SW8 acts to transfer the voltage output from the green data voltage output unit DAC[G] to the third data channel DCH3, it may operate in the image display time for driving of the display panel and the sensing time for sensing of the display panel.

The ninth switch SW9 may have a first electrode connected to the third data channel DCH3, a second electrode connected to the fourth data channel DCH4, and a control electrode connected to a ninth switch control line to which a ninth switch control signal is transferred. The ninth switch SW9 may act to transfer a voltage output from the green data voltage output unit DAC[G] to the fourth data channel DCH4 or transfer a voltage output from the blue data voltage output unit DAC[B] to the third data channel DCH3. That is, the ninth switch SW9 may act to help voltage sharing such that, when one of the green data voltage output unit DAC[G] and the blue data voltage output unit DAC[B] adjacent to each other is driven to output the pre-charge voltage, the other one can apply the black data voltage or the sensing voltage instead.

The tenth switch SW10 may have a first electrode connected to the output terminal of the blue data voltage output unit DAC[B], a second electrode connected to the fourth data channel DCH4, and a control electrode connected to a tenth switch control line to which a tenth switch control signal is transferred. The tenth switch SW10 may act to transfer a voltage output from the blue data voltage output unit DAC[B] to the fourth data channel DCH4. Because the tenth switch SW10 acts to transfer the voltage output from the blue data voltage output unit DAC[B] to the fourth data channel DCH4, it may operate in the image display time for driving of the display panel and the sensing time for sensing of the display panel.

Hereinafter, a driving method of the second embodiment and a part of the associated device operation will be described with reference to an example of using a voltage output from the green data voltage output unit DAC[G] as the pre-charge voltage in an operation of sensing the white sub-pixel SPW.

As shown in FIGS. 16 and 17, the first switch control signal Sw1, the third switch control signal Sw3, the sixth switch control signal Sw6, the ninth switch control signal Sw9 and the tenth switch control signal Sw10 may be applied as logic high H for the sensing time.

When the first switch control signal Sw1, third switch control signal Sw3, sixth switch control signal Sw6, ninth switch control signal Sw9 and tenth switch control signal Sw10 of logic high H are applied, the first switch SW1, the third switch SW3, the sixth switch SW6, the ninth switch SW9 and the tenth switch SW10 may be turned on.

At this time, the red data voltage output unit DAC[R] and the blue data voltage output unit DAC[B] may each output the black data voltage of 0V, and the green data voltage output unit DAC[G] may output the pre-charge voltage. In contrast, the white data voltage output unit DAC[W] may output the sensing voltage to sense the white sub-pixel SPW.

The black data voltage of 0V output from the red data voltage output unit DAC[R] may be output through the first data channel DCH1 via the turned-on first switch SW1 and then transferred to the first data line DLL The black data voltage of 0V output from the blue data voltage output unit DAC[B] may be output through the fourth data channel DCH4 via the turned-on tenth switch SW10 and then transferred to the fourth data line DL4. In addition, the black data voltage of 0V output from the blue data voltage output unit DAC[B] may be output through the third data channel DCH3 via the turned-on ninth switch SW9 and then transferred to the third data line DL3.

The pre-charge voltage output from the green data voltage output unit DAC[G] may be output through the first sensing channel SIO1 via the turned-on sixth switch SW6 and then transferred to the first reference line REF1. The pre-charge voltage transferred to the first reference line REF1 may be applied to the sensing node of the white sub-pixel SPW via the turned-on sensing transistor ST thereof.

As can be seen from the above operation, because the green data voltage output unit DAC[G] is driven to output the pre-charge voltage, the black data voltage of 0V to the third data line DL3 may be replaced with the black data voltage of 0V output from the blue data voltage output unit DAC[B] adjacent thereto. This is possible because the ninth switch SW9 is connected between the third data channel DCH3 and the fourth data channel DCH4 and turned on corresponding to an output time of the black data voltage of 0V to establish voltage sharing.

In the opposite case, that is, in the case where the blue data voltage output unit DAC[B] is driven to output the pre-charge voltage, the above complementary operation may also be performed. The above complementary operation may also be performed in the red data voltage output unit DAC[R] and white data voltage output unit DAC[W] having the same switch structure as that of the green data voltage output unit DAC[G] and blue data voltage output unit DAC[B].

As a result, the green data voltage output unit DAC[G] may have an operation condition capable of outputting the pre-charge voltage instead of the black data voltage of 0V which is its own output. On the other hand, the pre-charge voltage may be temporarily applied unlike other voltages. For this reason, the sixth switch control signal Sw6 for control of the associated sixth switch SW6 appears as logic high H for a shorter time than other switch control signals as an example, but the present invention is not limited thereto.

That is, the sixth switch control signal Sw6 for control of the sixth switch SW6 may vary with the level or application time of the pre-charge voltage.

As stated above, the second embodiment may use, as the pre-charge voltage, the voltage output from one of the data voltage output units DAC[W], DAC[R], DAC[G] and DAC [B] instead of the reference voltage applied from the external voltage source or the internal voltage source. As a result, it may be possible to shorten the sensing time for sensing of the sub-pixel.

Figure 18:
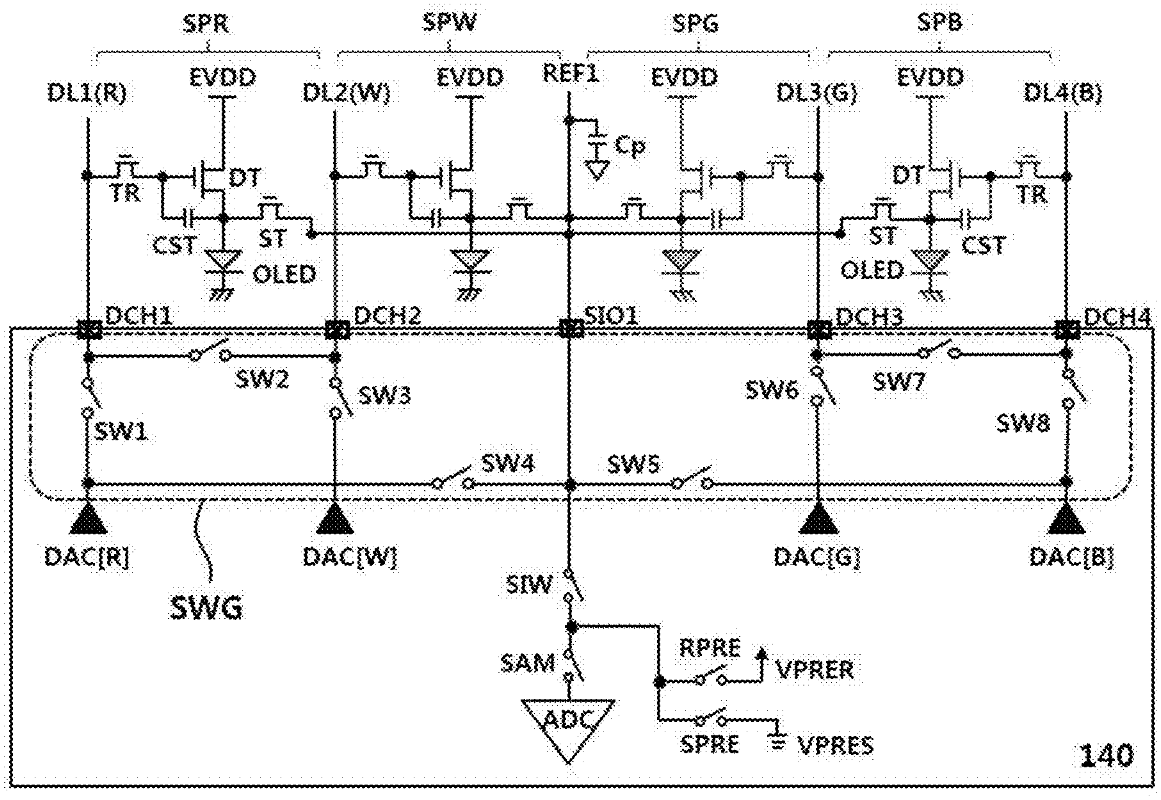
FIG. 18 is a circuit diagram of an LED device according to a third embodiment of the present disclosure.
Figure 19:
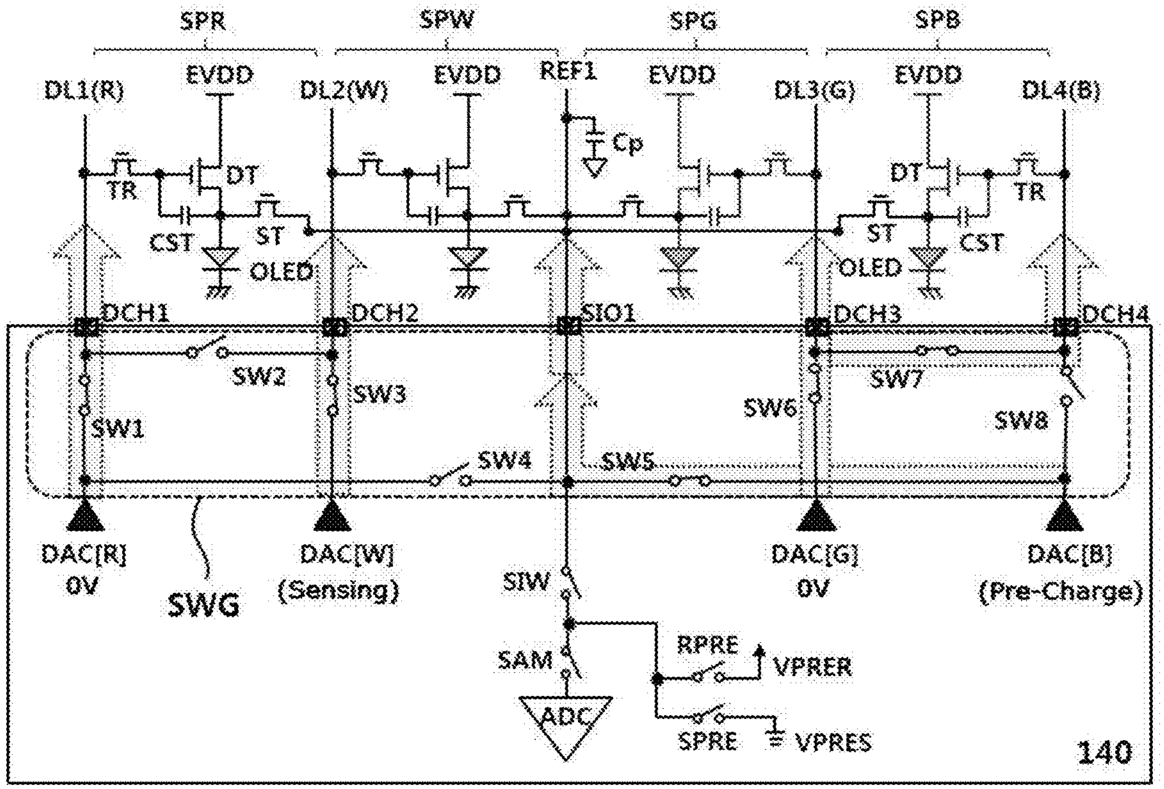
FIGS. 19 and 20 are views illustrating a part of a sensing operation of the LED device according to the third embodiment of the present disclosure.
Figure 20:
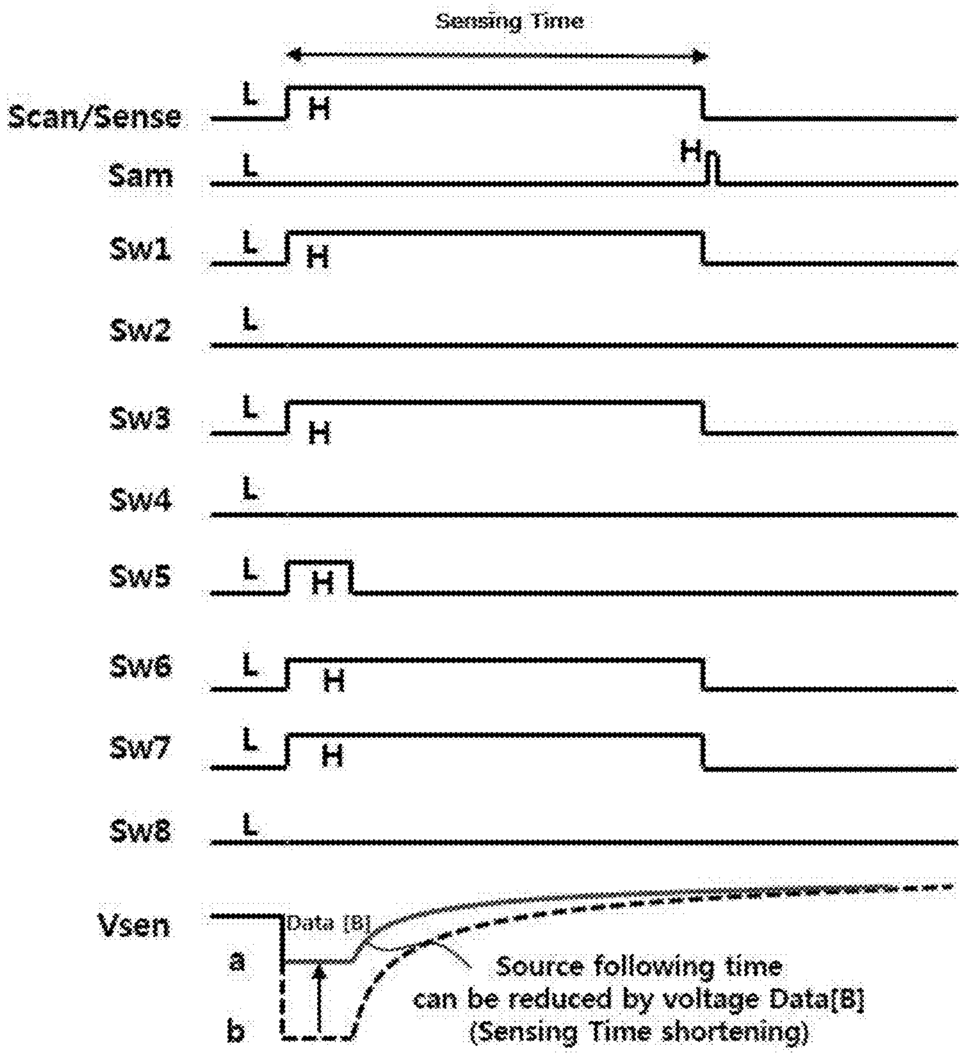

FIG. 18 is a circuit diagram of an LED device according to a third embodiment of the present disclosure, and FIGS. 19 and 20 are views illustrating a part of a sensing operation of the LED device according to the third embodiment of the present disclosure.

As shown in FIG. 18, the data driver 140 may include a switch group SWG including first to eighth switches SW1 to SW8. The switch group SWG may act to transfer a voltage output from one of the red data voltage output unit DAC[R], the white data voltage output unit DAC[W], the green data voltage output unit DAC[G] and the blue data voltage output unit DAC[B] to a channel thereof or another channel adjacent thereto.

In the third embodiment of the present disclosure, because the pre-charge voltage output from one of the red data voltage output unit DAC[R] and the blue data voltage output unit DAC[B] is transferred to the first sensing channel SIO1, a total of eight switches SW1 to SW8 may constitute the switch group SWG.

The first switch SW1 may have a first electrode connected to an output terminal of the red data voltage output unit DAC[R], a second electrode connected to the first data channel DCH1, and a control electrode connected to a first switch control line to which a first switch control signal is transferred. The first switch SW1 may act to transfer a voltage output from the red data voltage output unit DAC[R] to the first data channel DCH1.

The second switch SW2 may have a first electrode connected to the first data channel DCH1, a second electrode connected to the second data channel DCH2, and a control electrode connected to a second switch control line to which a second switch control signal is transferred. The second switch SW2 may act to transfer a voltage output from the red data voltage output unit DAC[R] to the second data channel DCH2 or transfer a voltage output from the white data voltage output unit DAC[W] to the first data channel DCH1. That is, the second switch SW2 may act to help voltage sharing such that, when one (particularly, the red data voltage output unit DAC[R]) of the red data voltage output unit DAC[R] and the white data voltage output unit DAC [W] adjacent to each other is driven to output the pre-charge voltage, the other one (particularly, the white data voltage output unit DAC[W]) can apply a black data voltage or a sensing voltage instead.

The third switch SW3 may have a first electrode connected to an output terminal of the white data voltage output unit DAC[W], a second electrode connected to the second data channel DCH2, and a control electrode connected to a third switch control line to which a third switch control signal is transferred. The third switch SW3 may act to transfer a voltage output from the white data voltage output unit DAC[W] to the second data channel DCH2.

The fourth switch SW4 may have a first electrode connected to the output terminal of the red data voltage output unit DAC[R], a second electrode connected to the first sensing channel SIO1, and a control electrode connected to a fourth switch control line to which a fourth switch control signal is transferred. The fourth switch SW4 may act to transfer a voltage output from the red data voltage output unit DAC[R] to the first sensing channel SIO1.

The fifth switch SW5 may have a first electrode connected to an output terminal of the blue data voltage output unit DAC[B], a second electrode connected to the first sensing channel SIO1, and a control electrode connected to a fifth switch control line to which a fifth switch control signal is transferred. The fifth switch SW5 may act to transfer a voltage output from the blue data voltage output unit DAC [B] to the first sensing channel SIO1.

The sixth switch SW6 may have a first electrode connected to an output terminal of the green data voltage output unit DAC[G], a second electrode connected to the third data channel DCH3, and a control electrode connected to a sixth switch control line to which a sixth switch control signal is transferred. The sixth switch SW6 may act to transfer a voltage output from the green data voltage output unit DAC[G] to the third data channel DCH3.

The seventh switch SW7 may have a first electrode connected to the third data channel DCH3, a second electrode connected to the fourth data channel DCH4, and a control electrode connected to a seventh switch control line to which a seventh switch control signal is transferred. The seventh switch SW7 may act to transfer a voltage output from the green data voltage output unit DAC[G] to the fourth data channel DCH4 or transfer a voltage output from the blue data voltage output unit DAC[B] to the third data channel DCH3. That is, the seventh switch SW7 may act to help voltage sharing such that, when one (particularly, the blue data voltage output unit DAC[B]) of the green data voltage output unit DAC[G] and the blue data voltage output unit DAC[B] adjacent to each other is driven to output the pre-charge voltage, the other one (particularly, the green data voltage output unit DAC[G]) can apply the black data voltage or the sensing voltage instead.

The eighth switch SW8 may have a first electrode connected to the output terminal of the blue data voltage output unit DAC[B], a second electrode connected to the fourth data channel DCH4, and a control electrode connected to an eighth switch control line to which an eighth switch control signal is transferred. The eighth switch SW8 may act to transfer a voltage output from the blue data voltage output unit DAC[B] to the fourth data channel DCH4.

Hereinafter, a driving method of the third embodiment and a part of the associated device operation will be described with reference to an example of using a voltage output from the blue data voltage output unit DAC[B] as the pre-charge voltage in an operation of sensing the white sub-pixel SPW.

As shown in FIGS. 19 and 20, the first switch control signal Sw1, the third switch control signal Sw3, the fifth switch control signal Sw5, the sixth switch control signal Sw6 and the seventh switch control signal Sw7 may be applied as logic high H for the sensing time.

When the first switch control signal Sw1, third switch control signal Sw3, fifth switch control signal Sw5, sixth switch control signal Sw6 and seventh switch control signal Sw7 of logic high H are applied, the first switch SW1, the third switch SW3, the fifth switch SW5, the sixth switch SW6 and the seventh switch SW7 may be turned on.

At this time, the red data voltage output unit DAC[R] and the green data voltage output unit DAC[G] may each output the black data voltage of 0V, and the blue data voltage output unit DAC[B] may output the pre-charge voltage. In contrast, the white data voltage output unit DAC[W] may output the sensing voltage to sense the white sub-pixel SPW.

The black data voltage of 0V output from the red data voltage output unit DAC[R] may be output through the first data channel DCH1 via the turned-on first switch SW1 and then transferred to the first data line DLL The black data voltage of 0V output from the green data voltage output unit DAC[G] may be output through the third data channel DCH3 via the turned-on sixth switch SW6 and then transferred to the third data line DL3. In addition, the black data voltage of 0V output from the green data voltage output unit DAC[G] may be output through the fourth data channel DCH4 via the turned-on seventh switch SW7 and then transferred to the fourth data line DL4.

The pre-charge voltage output from the blue data voltage output unit DAC[B] may be output through the first sensing channel SIO1 via the turned-on fifth switch SW5 and then transferred to the first reference line REF1. The pre-charge voltage transferred to the first reference line REF1 may be applied to the sensing node of the white sub-pixel SPW via the turned-on sensing transistor ST thereof.

As can be seen from the above operation, because the blue data voltage output unit DAC[B] is driven to output the pre-charge voltage, the black data voltage of 0V to the fourth data line DL4 may be replaced with the black data voltage of 0V output from the green data voltage output unit DAC[G] adjacent thereto. This is possible because the seventh switch SW7 is connected between the third data channel DCH3 and the fourth data channel DCH4 and turned on corresponding to an output time of the black data voltage of 0V to establish voltage sharing.

This is similarly applied to the red data voltage output unit DAC[R] and the white data voltage output unit DAC[W] in which the second switch SW2 is connected between the first data channel DCH1 and the second data channel DCH2. Exceptionally, in the red data voltage output unit DAC[R] and the white data voltage output unit DAC[W], only the red data voltage output unit DAC[R] may be driven to output the pre-charge voltage. As a result, the black data voltage of 0V to the first data line DL1 may be replaced with the black data voltage of 0V output from the white data voltage output unit DAC[W] adjacent thereto.

As stated above, the third embodiment may also use, as the pre-charge voltage, the voltage output from one of the red data voltage output unit DAC[R] and the blue data voltage output unit DAC[B] instead of the reference voltage applied from the external voltage source or the internal voltage source. As a result, it may be possible to shorten the sensing time for sensing of the sub-pixel.

Figure 21:
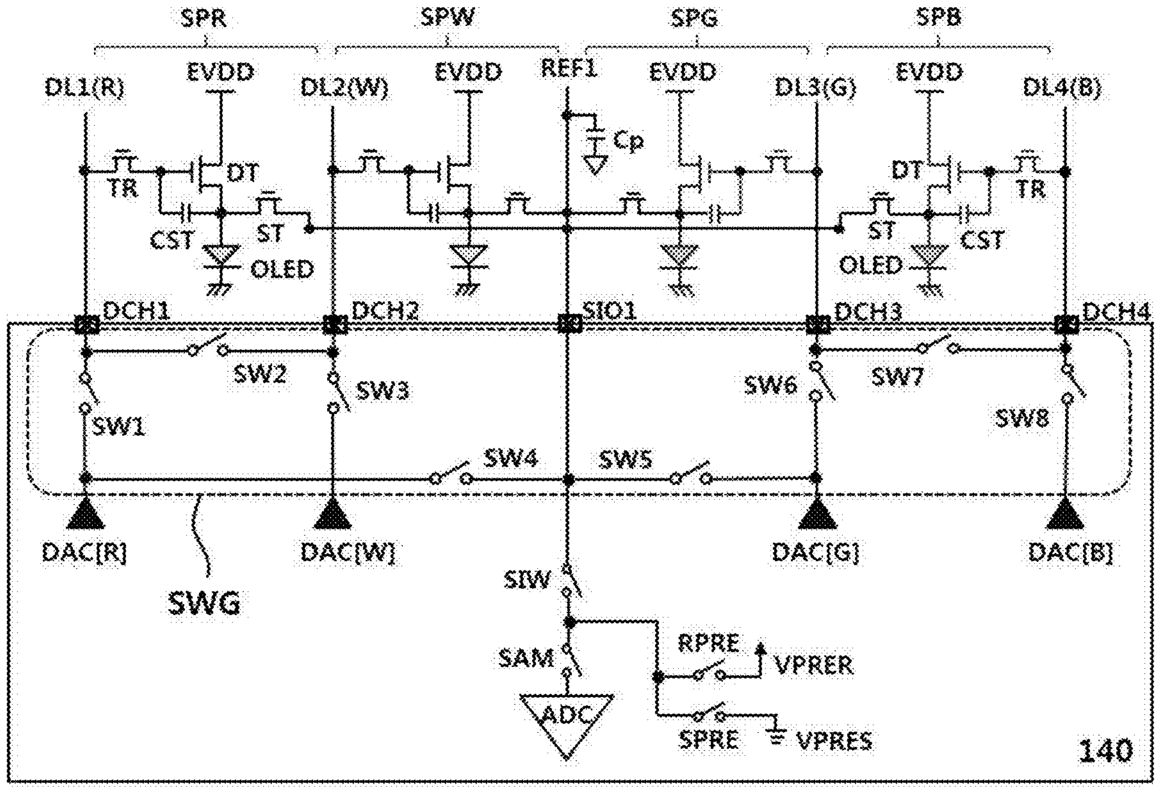
FIG. 21 is a circuit diagram of an LED device according to a fourth embodiment of the present disclosure.
Figure 22:
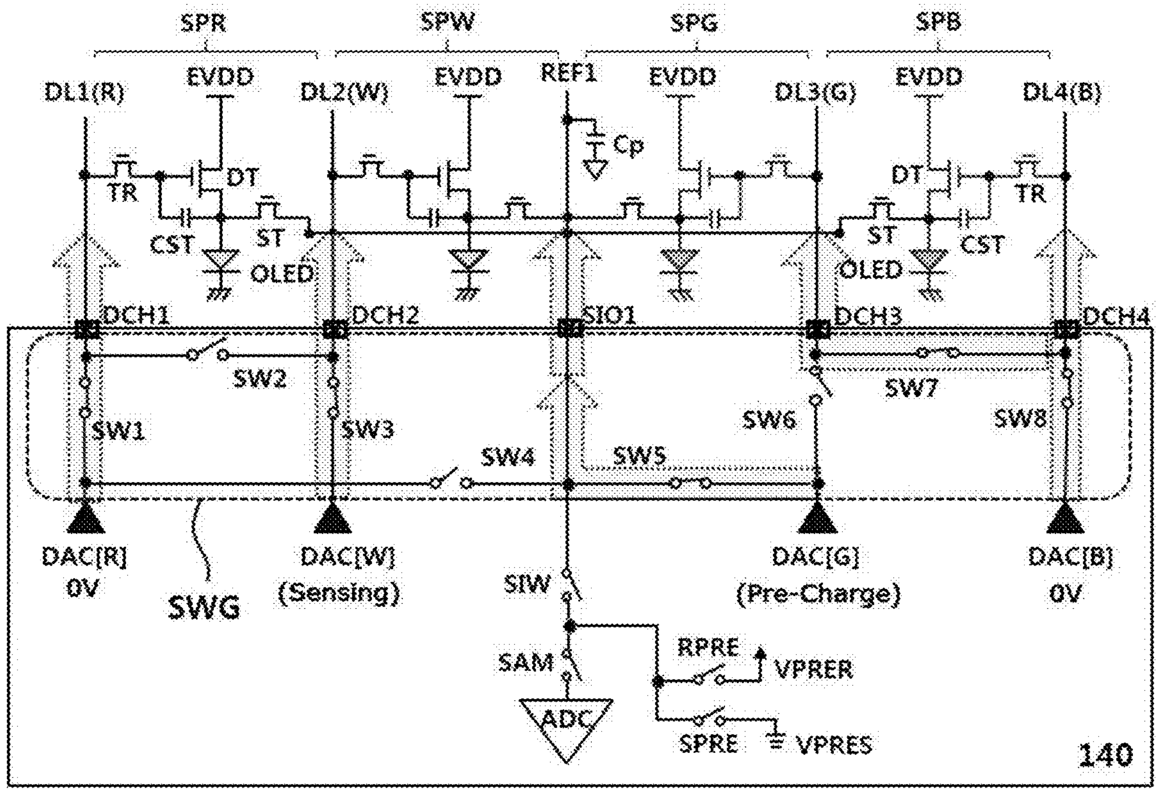
FIGS. 22 and 23 are views illustrating a part of a sensing operation of the LED device according to the fourth embodiment of the present disclosure.
Figure 23:
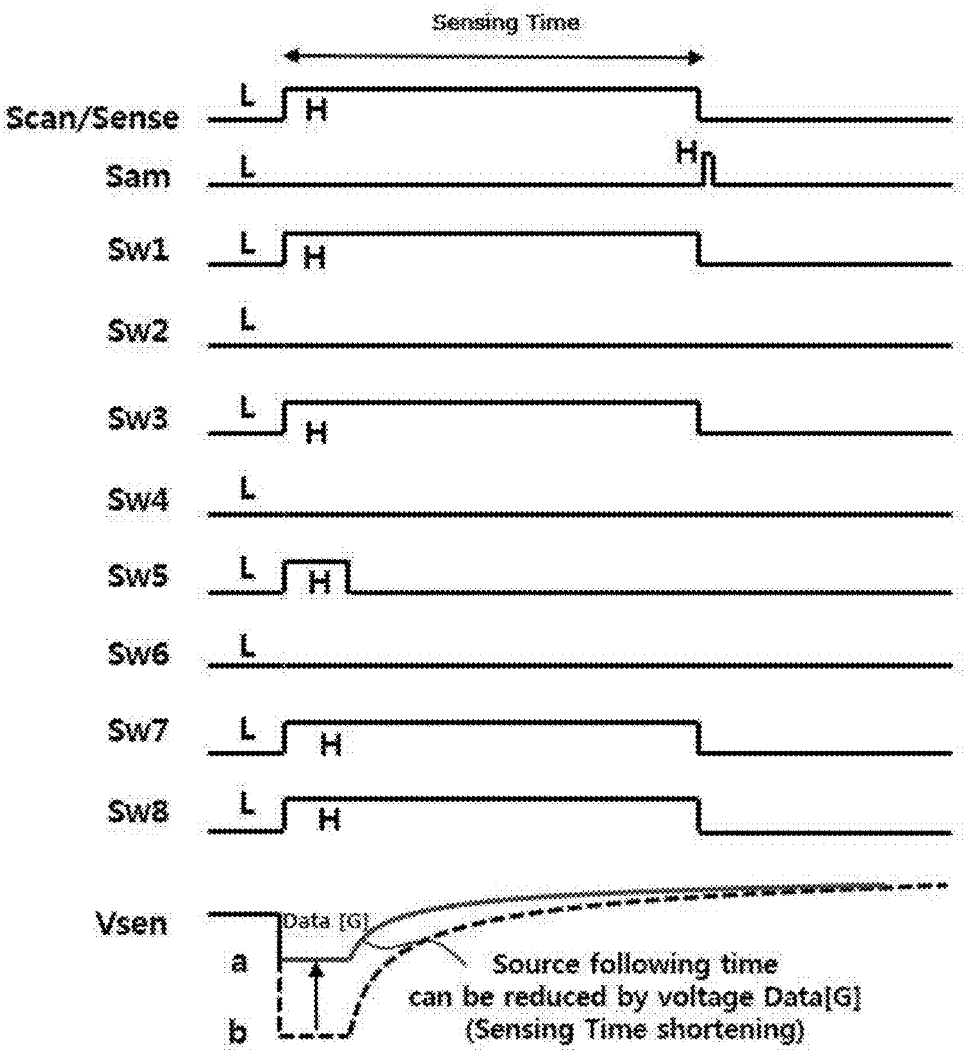

FIG. 21 is a circuit diagram of an LED device according to a fourth embodiment of the present disclosure, and FIGS. 22 and 23 are views illustrating a part of a sensing operation of the LED device according to the fourth embodiment of the present disclosure.

As shown in FIG. 21, the data driver 140 may include a switch group SWG including first to eighth switches SW1 to SW8. The switch group SWG may act to transfer a voltage output from one of the red data voltage output unit DAC[R], the white data voltage output unit DAC[W], the green data voltage output unit DAC[G] and the blue data voltage output unit DAC[B] to a channel thereof or another channel adjacent thereto.

In the fourth embodiment of the present disclosure, because the pre-charge voltage output from one of the red data voltage output unit DAC[R] and the green data voltage output unit DAC[G] is transferred to the first sensing channel SIO1, a total of eight switches SW1 to SW8 may constitute the switch group SWG.

The first switch SW1 may have a first electrode connected to an output terminal of the red data voltage output unit DAC[R], a second electrode connected to the first data channel DCH1, and a control electrode connected to a first switch control line to which a first switch control signal is transferred. The first switch SW1 may act to transfer a voltage output from the red data voltage output unit DAC[R] to the first data channel DCH1.

The second switch SW2 may have a first electrode connected to the first data channel DCH1, a second electrode connected to the second data channel DCH2, and a control electrode connected to a second switch control line to which a second switch control signal is transferred. The second switch SW2 may act to transfer a voltage output from the red data voltage output unit DAC[R] to the second data channel DCH2 or transfer a voltage output from the white data voltage output unit DAC[W] to the first data channel DCH1. That is, the second switch SW2 may act to help voltage sharing such that, when one (particularly, the red data voltage output unit DAC[R]) of the red data voltage output unit DAC[R] and the white data voltage output unit DAC [W] adjacent to each other is driven to output the pre-charge voltage, the other one (particularly, the white data voltage output unit DAC[W]) can apply a black data voltage or a sensing voltage instead.

The third switch SW3 may have a first electrode connected to an output terminal of the white data voltage output unit DAC[W], a second electrode connected to the second data channel DCH2, and a control electrode connected to a third switch control line to which a third switch control signal is transferred. The third switch SW3 may act to transfer a voltage output from the white data voltage output unit DAC[W] to the second data channel DCH2.

The fourth switch SW4 may have a first electrode connected to the output terminal of the red data voltage output unit DAC[R], a second electrode connected to the first sensing channel SIO1, and a control electrode connected to a fourth switch control line to which a fourth switch control signal is transferred. The fourth switch SW4 may act to transfer a voltage output from the red data voltage output unit DAC[R] to the first sensing channel SIO1.

The fifth switch SW5 may have a first electrode connected to an output terminal of the green data voltage output unit DAC[G], a second electrode connected to the first sensing channel SIO1, and a control electrode connected to a fifth switch control line to which a fifth switch control signal is transferred. The fifth switch SW5 may act to transfer a voltage output from the green data voltage output unit DAC[G] to the first sensing channel SIO1.

The sixth switch SW6 may have a first electrode connected to the output terminal of the green data voltage output unit DAC[G], a second electrode connected to the third data channel DCH3, and a control electrode connected to a sixth switch control line to which a sixth switch control signal is transferred. The sixth switch SW6 may act to transfer a voltage output from the green data voltage output unit DAC[G] to the third data channel DCH3.

The seventh switch SW7 may have a first electrode connected to the third data channel DCH3, a second electrode connected to the fourth data channel DCH4, and a control electrode connected to a seventh switch control line to which a seventh switch control signal is transferred. The seventh switch SW7 may act to transfer a voltage output from the green data voltage output unit DAC[G] to the fourth data channel DCH4 or transfer a voltage output from the blue data voltage output unit DAC[B] to the third data channel DCH3. That is, the seventh switch SW7 may act to help voltage sharing such that, when one (particularly, the green data voltage output unit DAC[G]) of the green data voltage output unit DAC[G] and the blue data voltage output unit DAC[B] adjacent to each other is driven to output the pre-charge voltage, the other one (particularly, the blue data voltage output unit DAC[B]) can apply the black data voltage or the sensing voltage instead.

The eighth switch SW8 may have a first electrode connected to an output terminal of the blue data voltage output unit DAC[B], a second electrode connected to the fourth data channel DCH4, and a control electrode connected to an eighth switch control line to which an eighth switch control signal is transferred. The eighth switch SW8 may act to transfer a voltage output from the blue data voltage output unit DAC[B] to the fourth data channel DCH4.

Hereinafter, a driving method of the fourth embodiment and a part of the associated device operation will be described with reference to an example of using a voltage output from the green data voltage output unit DAC[G] as the pre-charge voltage in an operation of sensing the white sub-pixel SPW.

As shown in FIGS. 22 and 23, the first switch control signal Sw1, the third switch control signal Sw3, the fifth switch control signal Sw5, the seventh switch control signal Sw7 and the eighth switch control signal Sw8 may be applied as logic high H for the sensing time.

When the first switch control signal Sw1, third switch control signal Sw3, fifth switch control signal Sw5, seventh switch control signal Sw7 and eighth switch control signal Sw8 of logic high H are applied, the first switch SW1, the third switch SW3, the fifth switch SW5, the seventh switch SW7 and the eighth switch SW8 may be turned on.

At this time, the red data voltage output unit DAC[R] and the blue data voltage output unit DAC[B] may each output the black data voltage of 0V, and the green data voltage output unit DAC[G] may output the pre-charge voltage. In contrast, the white data voltage output unit DAC[W] may output the sensing voltage to sense the white sub-pixel SPW.

The black data voltage of 0V output from the red data voltage output unit DAC[R] may be output through the first data channel DCH1 via the turned-on first switch SW1 and then transferred to the first data line DLL The black data voltage of 0V output from the blue data voltage output unit DAC[B] may be output through the fourth data channel DCH4 via the turned-on eighth switch SW8 and then transferred to the fourth data line DL4. In addition, the black data voltage of 0V output from the blue data voltage output unit DAC[B] may be output through the third data channel DCH3 via the turned-on seventh switch SW7 and then transferred to the third data line DL3.

The pre-charge voltage output from the green data voltage output unit DAC[G] may be output through the first sensing channel SIO1 via the turned-on fifth switch SW5 and then transferred to the first reference line REF1. The pre-charge voltage transferred to the first reference line REF1 may be applied to the sensing node of the white sub-pixel SPW via the turned-on sensing transistor ST thereof.

As can be seen from the above operation, because the green data voltage output unit DAC[G] is driven to output the pre-charge voltage, the black data voltage of 0V to the third data line DL3 may be replaced with the black data voltage of 0V output from the blue data voltage output unit DAC[B] adjacent thereto. This is possible because the seventh switch SW7 is connected between the third data channel DCH3 and the fourth data channel DCH4 and turned on corresponding to an output time of the black data voltage of 0V to establish voltage sharing.

This is similarly applied to the red data voltage output unit DAC[R] and the white data voltage output unit DAC[W] in which the second switch SW2 is connected between the first data channel DCH1 and the second data channel DCH2. Exceptionally, in the red data voltage output unit DAC[R] and the white data voltage output unit DAC[W], only the red data voltage output unit DAC[R] may be driven to output the pre-charge voltage. As a result, the black data voltage of 0V to the first data line DL1 may be replaced with the black data voltage of 0V output from the white data voltage output unit DAC[W] adjacent thereto.

As stated above, the fourth embodiment may also use, as the pre-charge voltage, the voltage output from one of the red data voltage output unit DAC[R] and the green data voltage output unit DAC[G] instead of the reference voltage applied from the external voltage source or the internal voltage source. As a result, it may be possible to shorten the sensing time for sensing of the sub-pixel.

Figure 24:
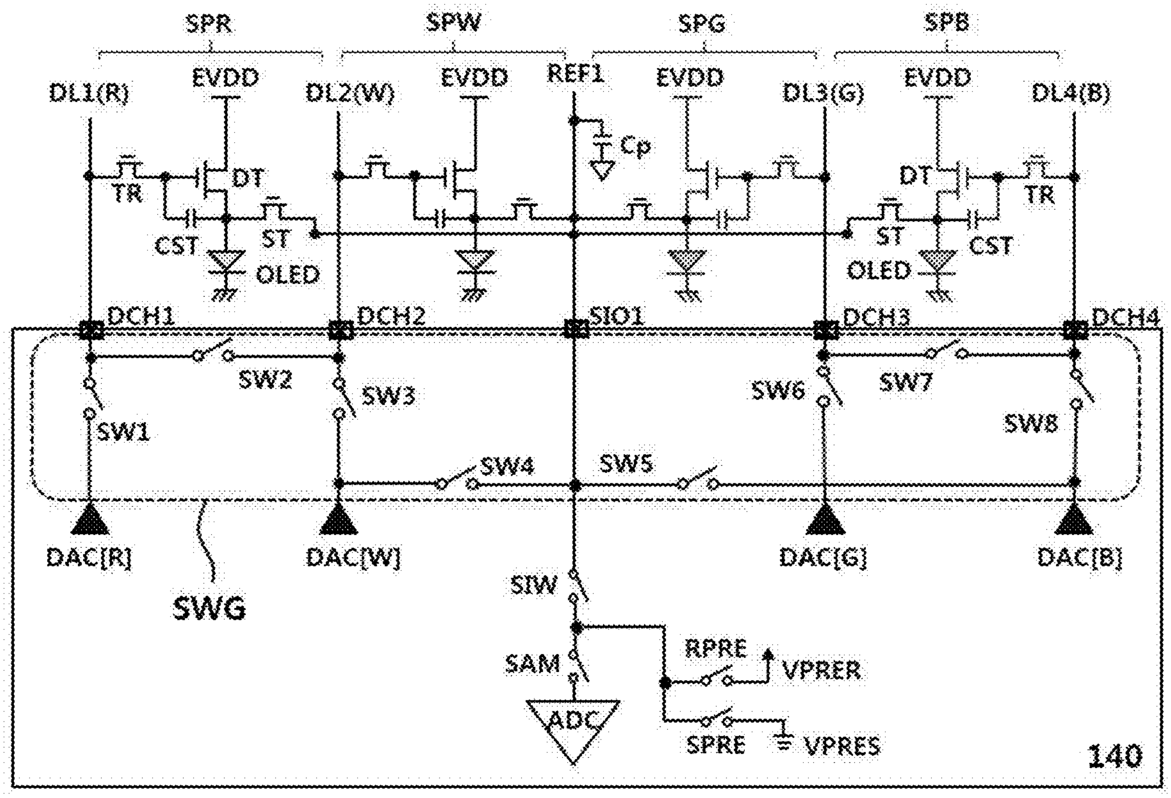
FIG. 24 is a circuit diagram of an LED device according to a fifth embodiment of the present disclosure.
Figure 25:
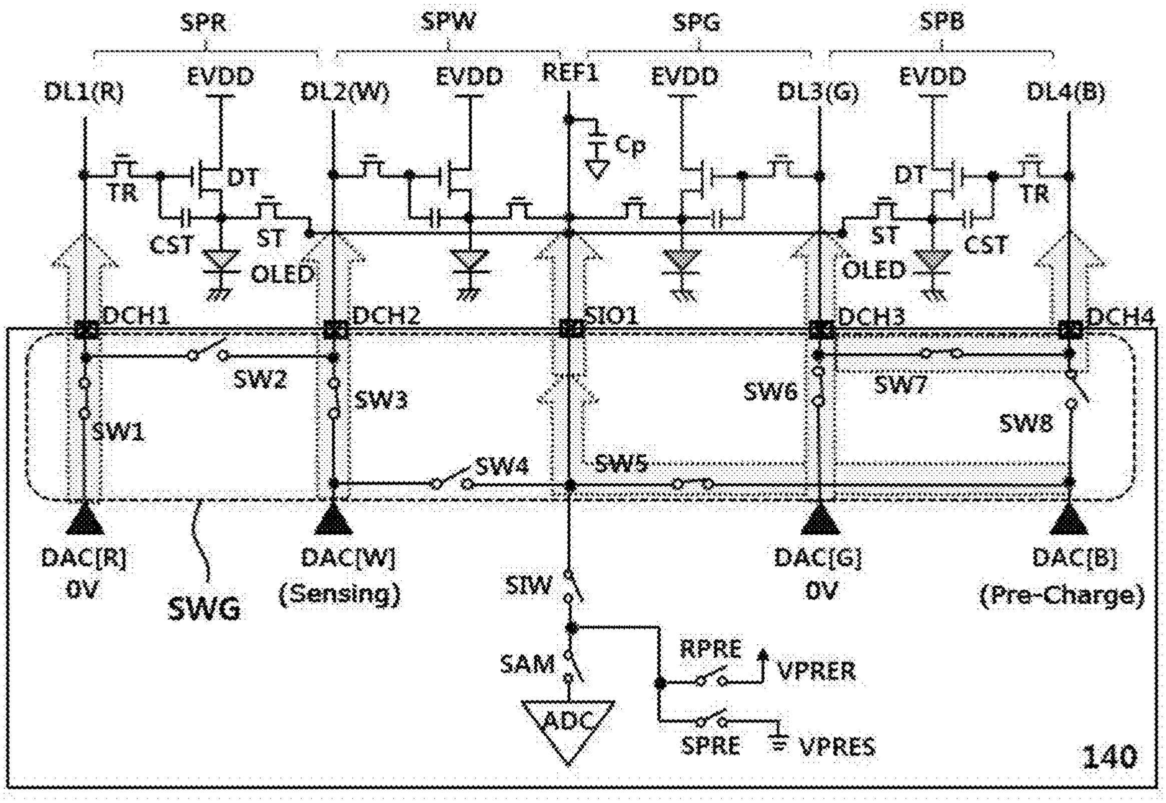
FIGS. 25 and 26 are views illustrating a part of a sensing operation of the LED device according to the fifth embodiment of the present disclosure.
Figure 26:
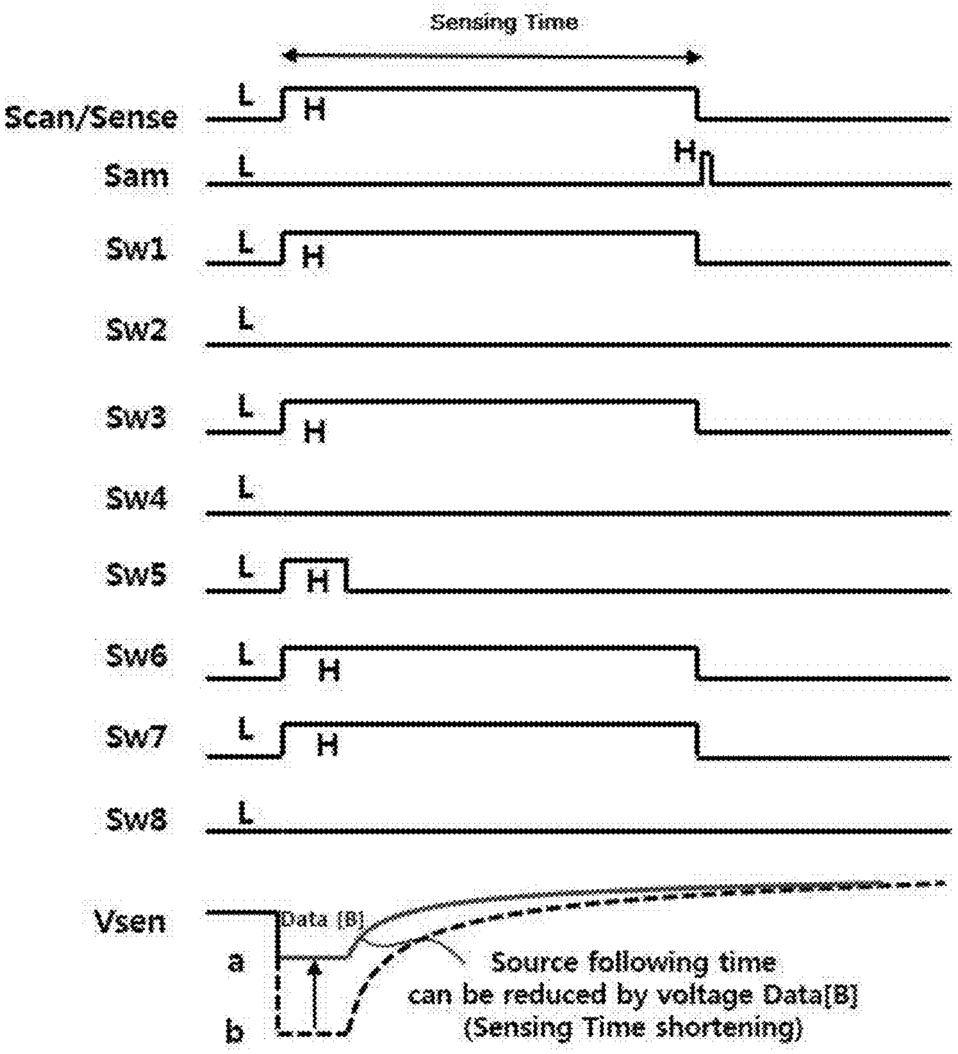

FIG. 24 is a circuit diagram of an LED device according to a fifth embodiment of the present disclosure, and FIGS. 25 and 26 are views illustrating a part of a sensing operation of the LED device according to the fifth embodiment of the present disclosure.

As shown in FIG. 24, the data driver 140 may include a switch group SWG including first to eighth switches SW1 to SW8. The switch group SWG may act to transfer a voltage output from one of the red data voltage output unit DAC[R], the white data voltage output unit DAC[W], the green data voltage output unit DAC[G] and the blue data voltage output unit DAC[B] to a channel thereof or another channel adjacent thereto.

In the fifth embodiment of the present disclosure, because the pre-charge voltage output from one of the white data voltage output unit DAC[W] and the blue data voltage output unit DAC[B] is transferred to the first sensing channel SIO1, a total of eight switches SW1 to SW8 may constitute the switch group SWG.

The first switch SW1 may have a first electrode connected to an output terminal of the red data voltage output unit DAC[R], a second electrode connected to the first data channel DCH1, and a control electrode connected to a first switch control line to which a first switch control signal is transferred. The first switch SW1 may act to transfer a voltage output from the red data voltage output unit DAC[R] to the first data channel DCH1.

The second switch SW2 may have a first electrode connected to the first data channel DCH1, a second electrode connected to the second data channel DCH2, and a control electrode connected to a second switch control line to which a second switch control signal is transferred. The second switch SW2 may act to transfer a voltage output from the red data voltage output unit DAC[R] to the second data channel DCH2 or transfer a voltage output from the white data voltage output unit DAC[W] to the first data channel DCH1. That is, the second switch SW2 may act to help voltage sharing such that, when one (particularly, the white data voltage output unit DAC[W]) of the red data voltage output unit DAC[R] and the white data voltage output unit DAC [W] adjacent to each other is driven to output the pre-charge voltage, the other one (particularly, the red data voltage output unit DAC[R]) can apply a black data voltage or a sensing voltage instead.

The third switch SW3 may have a first electrode connected to an output terminal of the white data voltage output unit DAC[W], a second electrode connected to the second data channel DCH2, and a control electrode connected to a third switch control line to which a third switch control signal is transferred. The third switch SW3 may act to transfer a voltage output from the white data voltage output unit DAC[W] to the second data channel DCH2.

The fourth switch SW4 may have a first electrode connected to the output terminal of the white data voltage output unit DAC[W], a second electrode connected to the first sensing channel SIO1, and a control electrode connected to a fourth switch control line to which a fourth switch control signal is transferred. The fourth switch SW4 may act to transfer a voltage output from the white data voltage output unit DAC[W] to the first sensing channel SIO1.

The fifth switch SW5 may have a first electrode connected to an output terminal of the blue data voltage output unit DAC[B], a second electrode connected to the first sensing channel SIO1, and a control electrode connected to a fifth switch control line to which a fifth switch control signal is transferred. The fifth switch SW5 may act to transfer a voltage output from the blue data voltage output unit DAC [B] to the first sensing channel SIO1.

The sixth switch SW6 may have a first electrode connected to an output terminal of the green data voltage output unit DAC[G], a second electrode connected to the third data channel DCH3, and a control electrode connected to a sixth switch control line to which a sixth switch control signal is transferred. The sixth switch SW6 may act to transfer a voltage output from the green data voltage output unit DAC[G] to the third data channel DCH3.

The seventh switch SW7 may have a first electrode connected to the third data channel DCH3, a second electrode connected to the fourth data channel DCH4, and a control electrode connected to a seventh switch control line to which a seventh switch control signal is transferred. The seventh switch SW7 may act to transfer a voltage output from the green data voltage output unit DAC[G] to the fourth data channel DCH4 or transfer a voltage output from the blue data voltage output unit DAC[B] to the third data channel DCH3. That is, the seventh switch SW7 may act to help voltage sharing such that, when one (particularly, the blue data voltage output unit DAC[B]) of the green data voltage output unit DAC[G] and the blue data voltage output unit DAC[B] adjacent to each other is driven to output the pre-charge voltage, the other one (particularly, the green data voltage output unit DAC[G]) can apply the black data voltage or the sensing voltage instead.

The eighth switch SW8 may have a first electrode connected to the output terminal of the blue data voltage output unit DAC[B], a second electrode connected to the fourth data channel DCH4, and a control electrode connected to an eighth switch control line to which an eighth switch control signal is transferred. The eighth switch SW8 may act to transfer a voltage output from the blue data voltage output unit DAC[B] to the fourth data channel DCH4.

Hereinafter, a driving method of the fifth embodiment and a part of the associated device operation will be described with reference to an example of using a voltage output from the blue data voltage output unit DAC[B] as the pre-charge voltage in an operation of sensing the white sub-pixel SPW.

As shown in FIGS. 25 and 26, the first switch control signal Sw1, the third switch control signal Sw3, the fifth switch control signal Sw5, the sixth switch control signal Sw6 and the seventh switch control signal Sw7 may be applied as logic high H for the sensing time.

When the first switch control signal Sw1, third switch control signal Sw3, fifth switch control signal Sw5, sixth switch control signal Sw6 and seventh switch control signal Sw7 of logic high H are applied, the first switch SW1, the third switch SW3, the fifth switch SW5, the sixth switch SW6 and the seventh switch SW7 may be turned on.

At this time, the red data voltage output unit DAC[R] and the green data voltage output unit DAC[G] may each output the black data voltage of 0V, and the blue data voltage output unit DAC[B] may output the pre-charge voltage. In contrast, the white data voltage output unit DAC[W] may output the sensing voltage to sense the white sub-pixel SPW.

The black data voltage of 0V output from the red data voltage output unit DAC[R] may be output through the first data channel DCH1 via the turned-on first switch SW1 and then transferred to the first data line DLL The black data voltage of 0V output from the green data voltage output unit DAC[G] may be output through the third data channel DCH3 via the turned-on sixth switch SW6 and then transferred to the third data line DL3. In addition, the black data voltage of 0V output from the green data voltage output unit DAC[G] may be output through the fourth data channel DCH4 via the turned-on seventh switch SW7 and then transferred to the fourth data line DL4.

The pre-charge voltage output from the blue data voltage output unit DAC[B] may be output through the first sensing channel SIO1 via the turned-on fifth switch SW5 and then transferred to the first reference line REF1. The pre-charge voltage transferred to the first reference line REF1 may be applied to the sensing node of the white sub-pixel SPW via the turned-on sensing transistor ST thereof.

As can be seen from the above operation, because the blue data voltage output unit DAC[B] is driven to output the pre-charge voltage, the black data voltage of 0V to the fourth data line DL4 may be replaced with the black data voltage of 0V output from the green data voltage output unit DAC[G] adjacent thereto. This is possible because the seventh switch SW7 is connected between the third data channel DCH3 and the fourth data channel DCH4 and turned on corresponding to an output time of the black data voltage of 0V to establish voltage sharing.

This is similarly applied to the red data voltage output unit DAC[R] and the white data voltage output unit DAC[W] in which the second switch SW2 is connected between the first data channel DCH1 and the second data channel DCH2. Exceptionally, in the red data voltage output unit DAC[R] and the white data voltage output unit DAC[W], only the white data voltage output unit DAC[W] may be driven to output the pre-charge voltage. As a result, the black data voltage of 0V to the second data line DL2 may be replaced with the black data voltage of 0V output from the red data voltage output unit DAC[R] adjacent thereto.

As stated above, the fifth embodiment may also use, as the pre-charge voltage, the voltage output from one of the white data voltage output unit DAC[W] and the blue data voltage output unit DAC[B] instead of the reference voltage applied from the external voltage source or the internal voltage source. As a result, it may be possible to shorten the sensing time for sensing of the sub-pixel.

As can be seen through the above-described embodiments, the present invention may describe various examples according to the configurations and connection relationships of the switches included in the switch group SWG and setting methods of controlling the associated devices. These examples will be known through the description of the operations of the above embodiments. Hereinafter, the configurations and connection relationships of the switches included in the switch group SWG will be mainly described.

Figure 27:
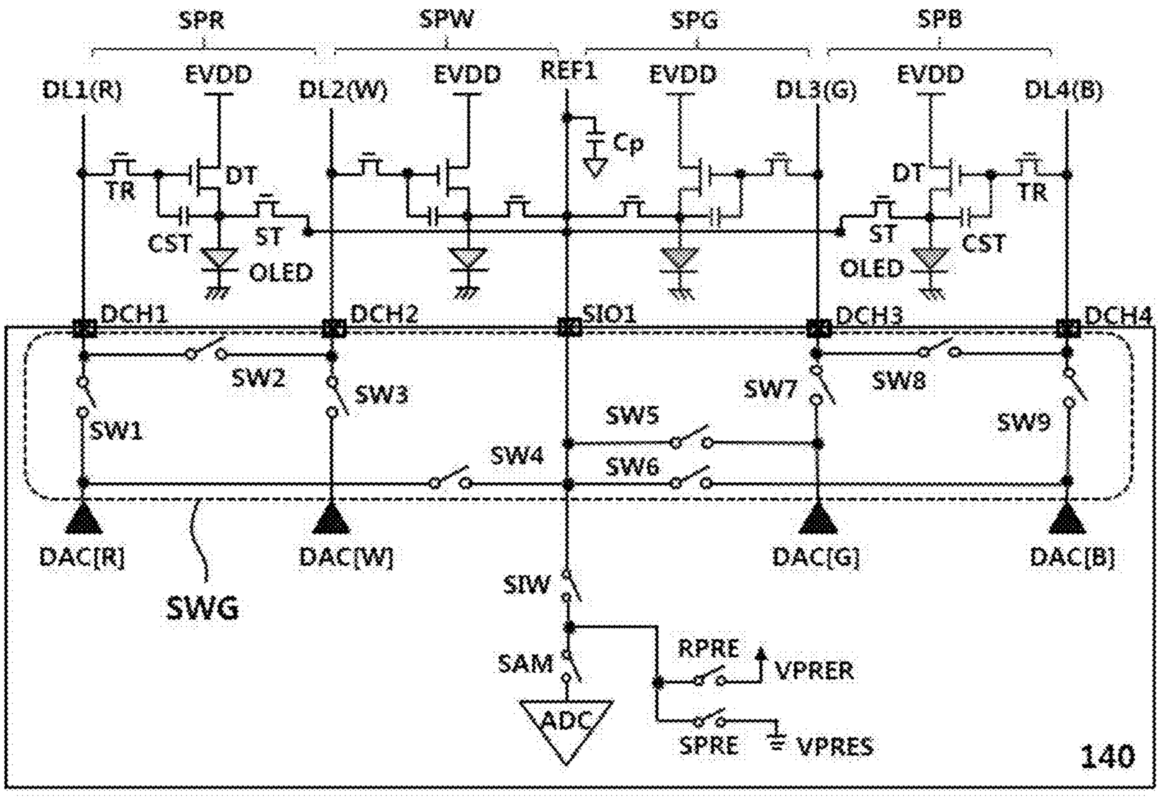
FIG. 27 is a circuit diagram of an LED device according to a sixth embodiment of the present disclosure.

FIG. 27 is a circuit diagram of an LED device according to a sixth embodiment of the present disclosure.

As shown in FIG. 27, the data driver 140 may include a switch group SWG including first to ninth switches SW1 to SW9. The switch group SWG may act to transfer a voltage output from one of the red data voltage output unit DAC[R], the white data voltage output unit DAC[W], the green data voltage output unit DAC[G] and the blue data voltage output unit DAC[B] to a channel thereof or another channel adjacent thereto.

In the sixth embodiment of the present disclosure, because the pre-charge voltage output from one of the data voltage output units DAC[R], DAC[G] and DAC[B] is transferred to the first sensing channel SIO1, a total of nine switches SW1 to SW9 may constitute the switch group SWG.

The first switch SW1 may have a first electrode connected to an output terminal of the red data voltage output unit DAC[R], a second electrode connected to the first data channel DCH1, and a control electrode connected to a first switch control line to which a first switch control signal is transferred. The first switch SW1 may act to transfer a voltage output from the red data voltage output unit DAC[R] to the first data channel DCH1.

The second switch SW2 may have a first electrode connected to the first data channel DCH1, a second electrode connected to the second data channel DCH2, and a control electrode connected to a second switch control line to which a second switch control signal is transferred. The second switch SW2 may act to transfer a voltage output from the red data voltage output unit DAC[R] to the second data channel DCH2 or transfer a voltage output from the white data voltage output unit DAC[W] to the first data channel DCH1. That is, the second switch SW2 may act to help voltage sharing such that, when one (particularly, the red data voltage output unit DAC[R]) of the red data voltage output unit DAC[R] and the white data voltage output unit DAC [W] adjacent to each other is driven to output the pre-charge voltage, the other one (particularly, the white data voltage output unit DAC[W]) can apply a black data voltage or a sensing voltage instead.

The third switch SW3 may have a first electrode connected to an output terminal of the white data voltage output unit DAC[W], a second electrode connected to the second data channel DCH2, and a control electrode connected to a third switch control line to which a third switch control signal is transferred. The third switch SW3 may act to transfer a voltage output from the white data voltage output unit DAC[W] to the second data channel DCH2.

The fourth switch SW4 may have a first electrode connected to the output terminal of the red data voltage output unit DAC[R], a second electrode connected to the first sensing channel SIO1, and a control electrode connected to a fourth switch control line to which a fourth switch control signal is transferred. The fourth switch SW4 may act to transfer a voltage output from the red data voltage output unit DAC[R] to the first sensing channel SIO1.

The fifth switch SW5 may have a first electrode connected to an output terminal of the green data voltage output unit DAC[G], a second electrode connected to the first sensing channel SIO1, and a control electrode connected to a fifth switch control line to which a fifth switch control signal is transferred. The fifth switch SW5 may act to transfer a voltage output from the green data voltage output unit DAC[G] to the first sensing channel SIO1.

The sixth switch SW6 may have a first electrode connected to an output terminal of the blue data voltage output unit DAC[B], a second electrode connected to the first sensing channel SIO1, and a control electrode connected to a sixth switch control line to which a sixth switch control signal is transferred. The sixth switch SW6 may act to transfer a voltage output from the blue data voltage output unit DAC[B] to the first sensing channel SIO1.

The seventh switch SW7 may have a first electrode connected to the output terminal of the green data voltage output unit DAC[G], a second electrode connected to the third data channel DCH3, and a control electrode connected to a seventh switch control line to which a seventh switch control signal is transferred. The seventh switch SW7 may act to transfer a voltage output from the green data voltage output unit DAC[G] to the third data channel DCH3.

The eighth switch SW8 may have a first electrode connected to the third data channel DCH3, a second electrode connected to the fourth data channel DCH4, and a control electrode connected to an eighth switch control line to which an eighth switch control signal is transferred. The eighth switch SW8 may act to transfer a voltage output from the green data voltage output unit DAC[G] to the fourth data channel DCH4 or transfer a voltage output from the blue data voltage output unit DAC[B] to the third data channel DCH3. That is, the eighth switch SW8 may act to help voltage sharing such that, when one of the green data voltage output unit DAC[G] and the blue data voltage output unit DAC[B] adjacent to each other is driven to output the pre-charge voltage, the other one can apply the black data voltage or the sensing voltage instead.

The ninth switch SW9 may have a first electrode connected to the output terminal of the blue data voltage output unit DAC[B], a second electrode connected to the fourth data channel DCH4, and a control electrode connected to a ninth switch control line to which a ninth switch control signal is transferred. The ninth switch SW9 may act to transfer a voltage output from the blue data voltage output unit DAC[B] to the fourth data channel DCH4.

As stated above, the sixth embodiment may also use, as the pre-charge voltage, the voltage output from one of the red data voltage output unit DAC[R], the green data voltage output unit DAC[G] and the blue data voltage output unit DAC[B] instead of the reference voltage applied from the external voltage source or the internal voltage source. As a result, it may be possible to shorten the sensing time for sensing of the sub-pixel.

Figure 28:
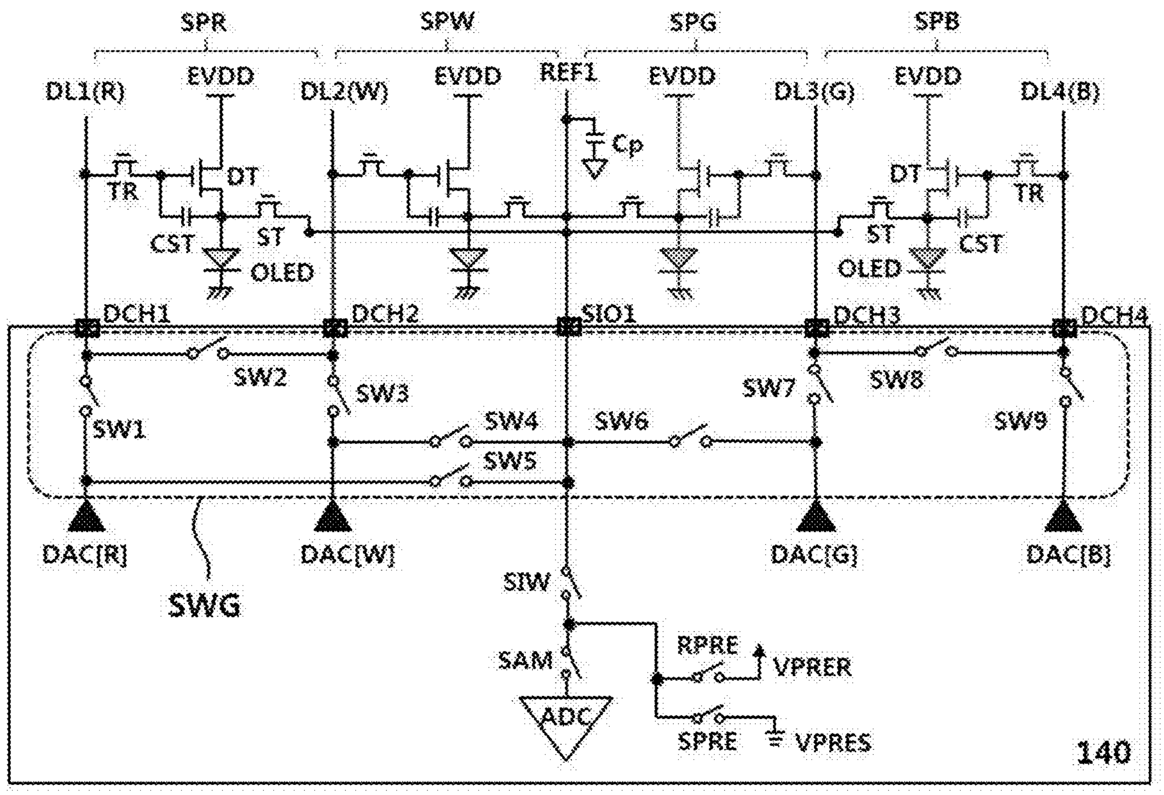
FIG. 28 is a circuit diagram of an LED device according to a seventh embodiment of the present disclosure.

FIG. 28 is a circuit diagram of an LED device according to a seventh embodiment of the present disclosure.

As shown in FIG. 28, the data driver 140 may include a switch group SWG including first to ninth switches SW1 to SW9. The switch group SWG may act to transfer a voltage output from one of the red data voltage output unit DAC[R], the white data voltage output unit DAC[W], the green data voltage output unit DAC[G] and the blue data voltage output unit DAC[B] to a channel thereof or another channel adjacent thereto.

In the seventh embodiment of the present disclosure, because the pre-charge voltage output from one of the data voltage output units DAC[R], DAC[W] and DAC[G] is transferred to the first sensing channel SIO1, a total of nine switches SW1 to SW9 may constitute the switch group SWG.

The first switch SW1 may have a first electrode connected to an output terminal of the red data voltage output unit DAC[R], a second electrode connected to the first data channel DCH1, and a control electrode connected to a first switch control line to which a first switch control signal is transferred. The first switch SW1 may act to transfer a voltage output from the red data voltage output unit DAC[R] to the first data channel DCH1.

The second switch SW2 may have a first electrode connected to the first data channel DCH1, a second electrode connected to the second data channel DCH2, and a control electrode connected to a second switch control line to which a second switch control signal is transferred. The second switch SW2 may act to transfer a voltage output from the red data voltage output unit DAC[R] to the second data channel DCH2 or transfer a voltage output from the white data voltage output unit DAC[W] to the first data channel DCH1. That is, the second switch SW2 may act to help voltage sharing such that, when one of the red data voltage output unit DAC[R] and the white data voltage output unit DAC [W] adjacent to each other is driven to output the pre-charge voltage, the other one can apply a black data voltage or a sensing voltage instead.

The third switch SW3 may have a first electrode connected to an output terminal of the white data voltage output unit DAC[W], a second electrode connected to the second data channel DCH2, and a control electrode connected to a third switch control line to which a third switch control signal is transferred. The third switch SW3 may act to transfer a voltage output from the white data voltage output unit DAC[W] to the second data channel DCH2.

The fourth switch SW4 may have a first electrode connected to the output terminal of the white data voltage output unit DAC[W], a second electrode connected to the first sensing channel SIO1, and a control electrode connected to a fourth switch control line to which a fourth switch control signal is transferred. The fourth switch SW4 may act to transfer a voltage output from the white data voltage output unit DAC[W] to the first sensing channel SIO1.

The fifth switch SW5 may have a first electrode connected to the output terminal of the red data voltage output unit DAC[R], a second electrode connected to the first sensing channel SIO1, and a control electrode connected to a fifth switch control line to which a fifth switch control signal is transferred. The fifth switch SW5 may act to transfer a voltage output from the red data voltage output unit DAC[R] to the first sensing channel SIO1.

The sixth switch SW6 may have a first electrode connected to an output terminal of the green data voltage output unit DAC[G], a second electrode connected to the first sensing channel SIO1, and a control electrode connected to a sixth switch control line to which a sixth switch control signal is transferred. The sixth switch SW6 may act to transfer a voltage output from the green data voltage output unit DAC[G] to the first sensing channel SIO1.

The seventh switch SW7 may have a first electrode connected to the output terminal of the green data voltage output unit DAC[G], a second electrode connected to the third data channel DCH3, and a control electrode connected to a seventh switch control line to which a seventh switch control signal is transferred. The seventh switch SW7 may act to transfer a voltage output from the green data voltage output unit DAC[G] to the third data channel DCH3.

The eighth switch SW8 may have a first electrode connected to the third data channel DCH3, a second electrode connected to the fourth data channel DCH4, and a control electrode connected to an eighth switch control line to which an eighth switch control signal is transferred. The eighth switch SW8 may act to transfer a voltage output from the green data voltage output unit DAC[G] to the fourth data channel DCH4 or transfer a voltage output from the blue data voltage output unit DAC[B] to the third data channel DCH3. That is, the eighth switch SW8 may act to help voltage sharing such that, when one (particularly, the green data voltage output unit DAC[G]) of the green data voltage output unit DAC[G] and the blue data voltage output unit DAC[B] adjacent to each other is driven to output the pre-charge voltage, the other one (particularly, the blue data voltage output unit DAC[B]) can apply the black data voltage or the sensing voltage instead.

The ninth switch SW9 may have a first electrode connected to an output terminal of the blue data voltage output unit DAC[B], a second electrode connected to the fourth data channel DCH4, and a control electrode connected to a ninth switch control line to which a ninth switch control signal is transferred. The ninth switch SW9 may act to transfer a voltage output from the blue data voltage output unit DAC[B] to the fourth data channel DCH4.

As stated above, the seventh embodiment may also use, as the pre-charge voltage, the voltage output from one of the red data voltage output unit DAC[R], the white data voltage output unit DAC[W] and the green data voltage output unit DAC[G] instead of the reference voltage applied from the external voltage source or the internal voltage source. As a result, it may be possible to shorten the sensing time for sensing of the sub-pixel.

Figure 29:
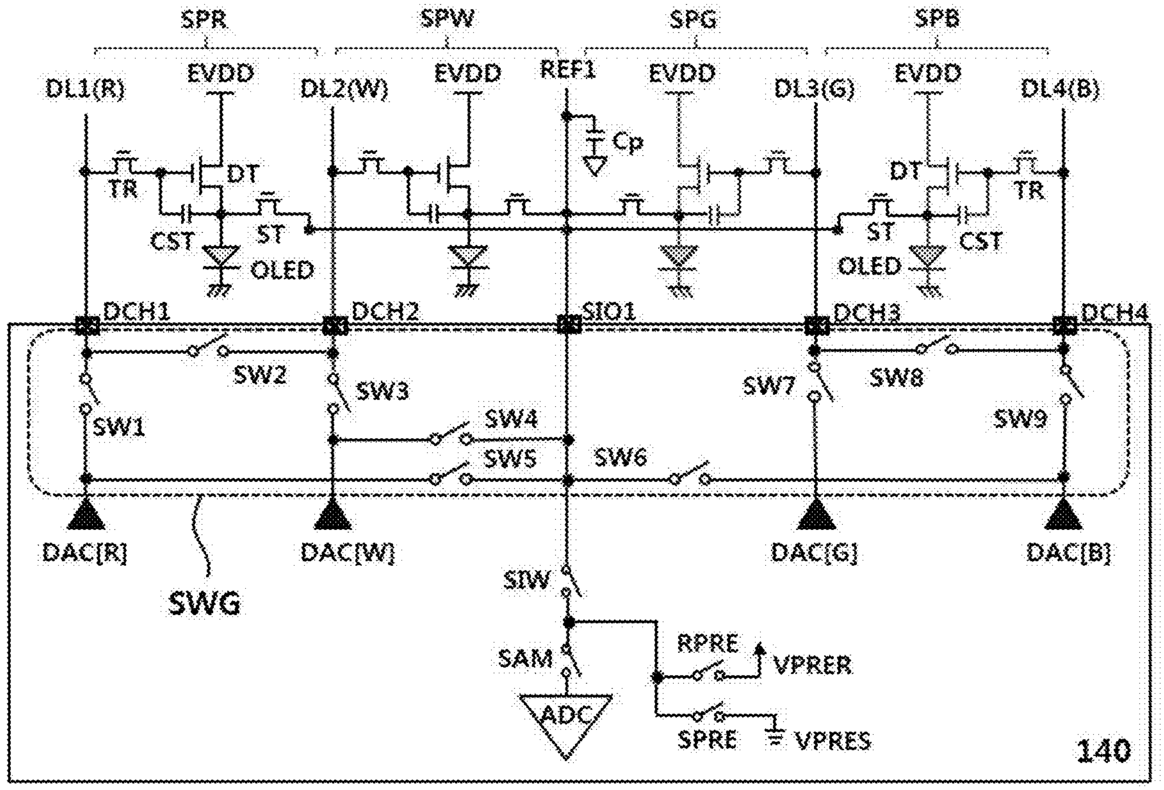
FIG. 29 is a circuit diagram of an LED device according to an eighth embodiment of the present disclosure.

FIG. 29 is a circuit diagram of an LED device according to an eighth embodiment of the present disclosure.

As shown in FIG. 29, the data driver 140 may include a switch group SWG including first to ninth switches SW1 to SW9. The switch group SWG may act to transfer a voltage output from one of the red data voltage output unit DAC[R], the white data voltage output unit DAC[W], the green data voltage output unit DAC[G] and the blue data voltage output unit DAC[B] to a channel thereof or another channel adjacent thereto.

In the eighth embodiment of the present invention, because the pre-charge voltage output from one of the data voltage output units DAC[R], DAC[W] and DAC[B] is transferred to the first sensing channel SIO1, a total of nine switches SW1 to SW9 may constitute the switch group SWG.

The first switch SW1 may have a first electrode connected to an output terminal of the red data voltage output unit DAC[R], a second electrode connected to the first data channel DCH1, and a control electrode connected to a first switch control line to which a first switch control signal is transferred. The first switch SW1 may act to transfer a voltage output from the red data voltage output unit DAC[R] to the first data channel DCH1.

The second switch SW2 may have a first electrode connected to the first data channel DCH1, a second electrode connected to the second data channel DCH2, and a control electrode connected to a second switch control line to which a second switch control signal is transferred. The second switch SW2 may act to transfer a voltage output from the red data voltage output unit DAC[R] to the second data channel DCH2 or transfer a voltage output from the white data voltage output unit DAC[W] to the first data channel DCH1. That is, the second switch SW2 may act to help voltage sharing such that, when one of the red data voltage output unit DAC[R] and the white data voltage output unit DAC [W] adjacent to each other is driven to output the pre-charge voltage, the other one can apply a black data voltage or a sensing voltage instead.

The third switch SW3 may have a first electrode connected to an output terminal of the white data voltage output unit DAC[W], a second electrode connected to the second data channel DCH2, and a control electrode connected to a third switch control line to which a third switch control signal is transferred. The third switch SW3 may act to transfer a voltage output from the white data voltage output unit DAC[W] to the second data channel DCH2.

The fourth switch SW4 may have a first electrode connected to the output terminal of the white data voltage output unit DAC[W], a second electrode connected to the first sensing channel SIO1, and a control electrode connected to a fourth switch control line to which a fourth switch control signal is transferred. The fourth switch SW4 may act to transfer a voltage output from the white data voltage output unit DAC[W] to the first sensing channel SIO1.

The fifth switch SW5 may have a first electrode connected to the output terminal of the red data voltage output unit DAC[R], a second electrode connected to the first sensing channel SIO1, and a control electrode connected to a fifth switch control line to which a fifth switch control signal is transferred. The fifth switch SW5 may act to transfer a voltage output from the red data voltage output unit DAC[R] to the first sensing channel SIO1.

The sixth switch SW6 may have a first electrode connected to an output terminal of the blue data voltage output unit DAC[B], a second electrode connected to the first sensing channel SIO1, and a control electrode connected to a sixth switch control line to which a sixth switch control signal is transferred. The sixth switch SW6 may act to transfer a voltage output from the blue data voltage output unit DAC[B] to the first sensing channel SIO1.

The seventh switch SW7 may have a first electrode connected to an output terminal of the green data voltage output unit DAC[G], a second electrode connected to the third data channel DCH3, and a control electrode connected to a seventh switch control line to which a seventh switch control signal is transferred. The seventh switch SW7 may act to transfer a voltage output from the green data voltage output unit DAC[G] to the third data channel DCH3.

The eighth switch SW8 may have a first electrode connected to the third data channel DCH3, a second electrode connected to the fourth data channel DCH4, and a control electrode connected to an eighth switch control line to which an eighth switch control signal is transferred. The eighth switch SW8 may act to transfer a voltage output from the green data voltage output unit DAC[G] to the fourth data channel DCH4 or transfer a voltage output from the blue data voltage output unit DAC[B] to the third data channel DCH3. That is, the eighth switch SW8 may act to help voltage sharing such that, when one (particularly, the blue data voltage output unit DAC[B]) of the green data voltage output unit DAC[G] and the blue data voltage output unit DAC[B] adjacent to each other is driven to output the pre-charge voltage, the other one (particularly, the green data voltage output unit DAC[G] can apply the black data voltage or the sensing voltage instead.

The ninth switch SW9 may have a first electrode connected to the output terminal of the blue data voltage output unit DAC[B], a second electrode connected to the fourth data channel DCH4, and a control electrode connected to a ninth switch control line to which a ninth switch control signal is transferred. The ninth switch SW9 may act to transfer a voltage output from the blue data voltage output unit DAC[B] to the fourth data channel DCH4.

As stated above, the eighth embodiment may also use, as the pre-charge voltage, the voltage output from one of the red data voltage output unit DAC[R], the white data voltage output unit DAC[W] and the blue data voltage output unit DAC[B] instead of the reference voltage applied from the external voltage source or the internal voltage source. As a result, it may be possible to shorten the sensing time for sensing of the sub-pixel.

Figure 30:
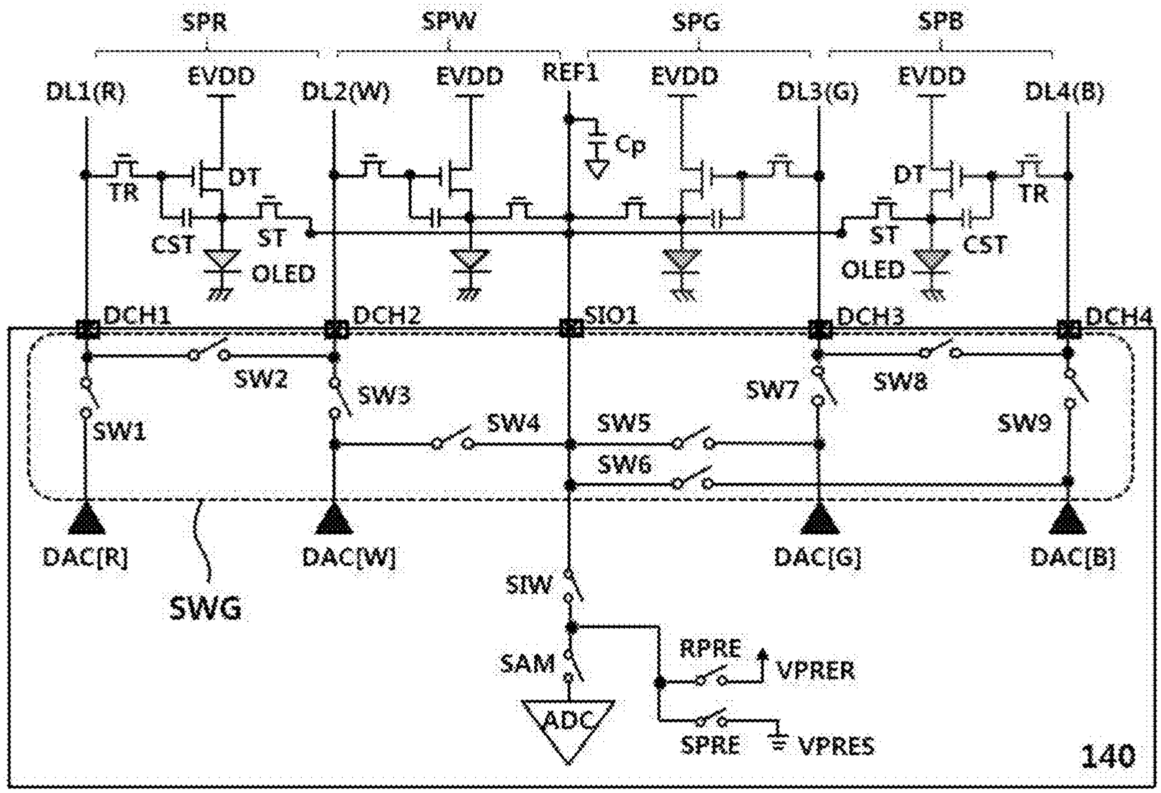
FIG. 30 is a circuit diagram of an LED device according to a ninth embodiment of the present disclosure.

FIG. 30 is a circuit diagram of an LED device according to a ninth embodiment of the present invention.

As shown in FIG. 30, the data driver 140 may include a switch group SWG including first to ninth switches SW1 to SW9. The switch group SWG may act to transfer a voltage output from one of the red data voltage output unit DAC[R], the white data voltage output unit DAC[W], the green data voltage output unit DAC[G] and the blue data voltage output unit DAC[B] to a channel thereof or another channel adjacent thereto.

In the ninth embodiment of the present invention, because the pre-charge voltage output from one of the data voltage output units DAC[W], DAC[G] and DAC[B] is transferred to the first sensing channel SIO1, a total of nine switches SW1 to SW9 may constitute the switch group SWG.

The first switch SW1 may have a first electrode connected to an output terminal of the red data voltage output unit DAC[R], a second electrode connected to the first data channel DCH1, and a control electrode connected to a first switch control line to which a first switch control signal is transferred. The first switch SW1 may act to transfer a voltage output from the red data voltage output unit DAC[R] to the first data channel DCH1.

The second switch SW2 may have a first electrode connected to the first data channel DCH1, a second electrode connected to the second data channel DCH2, and a control electrode connected to a second switch control line to which a second switch control signal is transferred. The second switch SW2 may act to transfer a voltage output from the red data voltage output unit DAC[R] to the second data channel DCH2 or transfer a voltage output from the white data voltage output unit DAC[W] to the first data channel DCH1. That is, the second switch SW2 may act to help voltage sharing such that, when one (particularly, the white data voltage output unit DAC[W]) of the red data voltage output unit DAC[R] and the white data voltage output unit DAC [W] adjacent to each other is driven to output the pre-charge voltage, the other one (particularly, the red data voltage output unit DAC[R]) can apply a black data voltage or a sensing voltage instead.

The third switch SW3 may have a first electrode connected to an output terminal of the white data voltage output unit DAC[W], a second electrode connected to the second data channel DCH2, and a control electrode connected to a third switch control line to which a third switch control signal is transferred. The third switch SW3 may act to transfer a voltage output from the white data voltage output unit DAC[W] to the second data channel DCH2.

The fourth switch SW4 may have a first electrode connected to the output terminal of the white data voltage output unit DAC[W], a second electrode connected to the first sensing channel SIO1, and a control electrode connected to a fourth switch control line to which a fourth switch control signal is transferred. The fourth switch SW4 may act to transfer a voltage output from the white data voltage output unit DAC[W] to the first sensing channel SIO1.

The fifth switch SW5 may have a first electrode connected to an output terminal of the green data voltage output unit DAC[G], a second electrode connected to the first sensing channel SIO1, and a control electrode connected to a fifth switch control line to which a fifth switch control signal is transferred. The fifth switch SW5 may act to transfer a voltage output from the green data voltage output unit DAC[G] to the first sensing channel SIO1.

The sixth switch SW6 may have a first electrode connected to an output terminal of the blue data voltage output unit DAC[B], a second electrode connected to the first sensing channel SIO1, and a control electrode connected to a sixth switch control line to which a sixth switch control signal is transferred. The sixth switch SW6 may act to transfer a voltage output from the blue data voltage output unit DAC[B] to the first sensing channel SIO1.

The seventh switch SW7 may have a first electrode connected to the output terminal of the green data voltage output unit DAC[G], a second electrode connected to the third data channel DCH3, and a control electrode connected to a seventh switch control line to which a seventh switch control signal is transferred. The seventh switch SW7 may act to transfer a voltage output from the green data voltage output unit DAC[G] to the third data channel DCH3.

The eighth switch SW8 may have a first electrode connected to the third data channel DCH3, a second electrode connected to the fourth data channel DCH4, and a control electrode connected to an eighth switch control line to which an eighth switch control signal is transferred. The eighth switch SW8 may act to transfer a voltage output from the green data voltage output unit DAC[G] to the fourth data channel DCH4 or transfer a voltage output from the blue data voltage output unit DAC[B] to the third data channel DCH3. That is, the eighth switch SW8 may act to help voltage sharing such that, when one of the green data voltage output unit DAC[G] and the blue data voltage output unit DAC[B] adjacent to each other is driven to output the pre-charge voltage, the other one can apply the black data voltage or the sensing voltage instead.

The ninth switch SW9 may have a first electrode connected to the output terminal of the blue data voltage output unit DAC[B], a second electrode connected to the fourth data channel DCH4, and a control electrode connected to a ninth switch control line to which a ninth switch control signal is transferred. The ninth switch SW9 may act to transfer a voltage output from the blue data voltage output unit DAC[B] to the fourth data channel DCH4.

As stated above, the ninth embodiment may also use, as the pre-charge voltage, the voltage output from one of the white data voltage output unit DAC[W], the green data voltage output unit DAC[G] and the blue data voltage output unit DAC[B] instead of the reference voltage applied from the external voltage source or the internal voltage source. As a result, it may be possible to shorten the sensing time for sensing of the sub-pixel.

Figure 31:
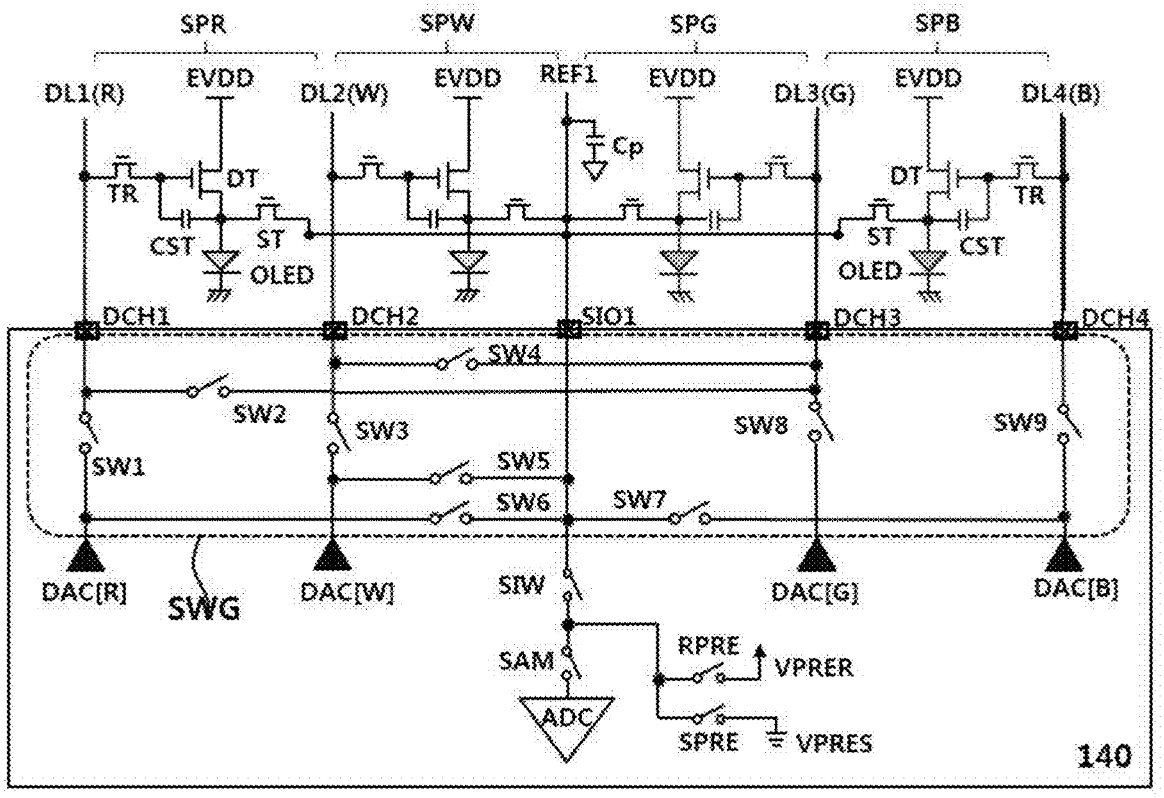
FIG. 31 is a circuit diagram of an LED device according to a tenth embodiment of the present disclosure.

FIG. 31 is a circuit diagram of an LED device according to a tenth embodiment of the present disclosure.

As shown in FIG. 31, the data driver 140 may include a switch group SWG including first to ninth switches SW1 to SW9. The switch group SWG may act to transfer a voltage output from one of the red data voltage output unit DAC[R], the white data voltage output unit DAC[W], the green data voltage output unit DAC[G] and the blue data voltage output unit DAC[B] to a channel thereof or another channel adjacent thereto.

In the tenth embodiment of the present invention, because the pre-charge voltage output from one of the data voltage output units DAC[W], DAC[R], and DAC[B] is transferred to the first sensing channel SIO1, a total of nine switches SW1 to SW9 may constitute the switch group SWG.

The first switch SW1 may have a first electrode connected to an output terminal of the red data voltage output unit DAC[R], a second electrode connected to the first data channel DCH1, and a control electrode connected to a first switch control line to which a first switch control signal is transferred. The first switch SW1 may act to transfer a voltage output from the red data voltage output unit DAC[R] to the first data channel DCH1.

The second switch SW2 may have a first electrode connected to the first data channel DCH1, a second electrode connected to the third data channel DCH3, and a control electrode connected to a second switch control line to which a second switch control signal is transferred. The second switch SW2 may act to transfer a voltage output from the red data voltage output unit DAC[R] to the third data channel DCH3 or transfer a voltage output from the green data voltage output unit DAC[G] to the first data channel DCH1. That is, the second switch SW2 may act to help voltage sharing such that, when one (particularly, the red data voltage output unit DAC[R]) of the red data voltage output unit DAC[R] and the green data voltage output unit DAC[G] spaced apart from each other is driven to output the pre-charge voltage, the other one (particularly, the green data voltage output unit DAC[G]) can apply a black data voltage or a sensing voltage instead.

The third switch SW3 may have a first electrode connected to an output terminal of the white data voltage output unit DAC[W], a second electrode connected to the second data channel DCH2, and a control electrode connected to a third switch control line to which a third switch control signal is transferred. The third switch SW3 may act to transfer a voltage output from the white data voltage output unit DAC[W] to the second data channel DCH2.

The fourth switch SW4 may have a first electrode connected to the second data channel DCH2, a second electrode connected to the third data channel DCH3, and a control electrode connected to a fourth switch control line to which a fourth switch control signal is transferred. The fourth switch SW4 may act to transfer a voltage output from the white data voltage output unit DAC[W] to the third data channel DCH3 or transfer a voltage output from the green data voltage output unit DAC[G] to the second data channel DCH2. That is, the fourth switch SW4 may act to help voltage sharing such that, when one (particularly, the white data voltage output unit DAC[W]) of the white data voltage output unit DAC[W] and the green data voltage output unit DAC[G] spaced apart from each other is driven to output the pre-charge voltage, the other one (particularly, the green data voltage output unit DAC[G]) can apply the black data voltage or the sensing voltage instead.

The fifth switch SW5 may have a first electrode connected to the output terminal of the white data voltage output unit DAC[W], a second electrode connected to the first sensing channel SIO1, and a control electrode connected to a fifth switch control line to which a fifth switch control signal is transferred. The fifth switch SW5 may act to transfer a voltage output from the white data voltage output unit DAC[W] to the first sensing channel SIO1.

The sixth switch SW6 may have a first electrode connected to the output terminal of the red data voltage output unit DAC[R], a second electrode connected to the first sensing channel SIO1, and a control electrode connected to a sixth switch control line to which a sixth switch control signal is transferred. The sixth switch SW6 may act to transfer a voltage output from the red data voltage output unit DAC[R] to the first sensing channel SIO1.

The seventh switch SW7 may have a first electrode connected to an output terminal of the blue data voltage output unit DAC[B], a second electrode connected to the first sensing channel SIO1, and a control electrode connected to a seventh switch control line to which a seventh switch control signal is transferred. The seventh switch SW7 may act to transfer a voltage output from the blue data voltage output unit DAC[B] to the first sensing channel SIO1.

The eighth switch SW8 may have a first electrode connected to an output terminal of the green data voltage output unit DAC[G], a second electrode connected to the third data channel DCH3, and a control electrode connected to an eighth switch control line to which an eighth switch control signal is transferred. The eighth switch SW8 may act to transfer a voltage output from the green data voltage output unit DAC[G] to the third data channel DCH3.

The ninth switch SW9 may have a first electrode connected to the output terminal of the blue data voltage output unit DAC[B], a second electrode connected to the fourth data channel DCH4, and a control electrode connected to a ninth switch control line to which a ninth switch control signal is transferred. The ninth switch SW9 may act to transfer a voltage output from the blue data voltage output unit DAC[B] to the fourth data channel DCH4.

As stated above, the tenth embodiment may also use, as the pre-charge voltage, the voltage output from one of the white data voltage output unit DAC[W], the red data voltage output unit DAC[R], and the blue data voltage output unite DAC[B] instead of the reference voltage applied from the external voltage source or the internal voltage source. As a result, it may be possible to shorten the sensing time for sensing of the sub-pixel.

Figure 32:
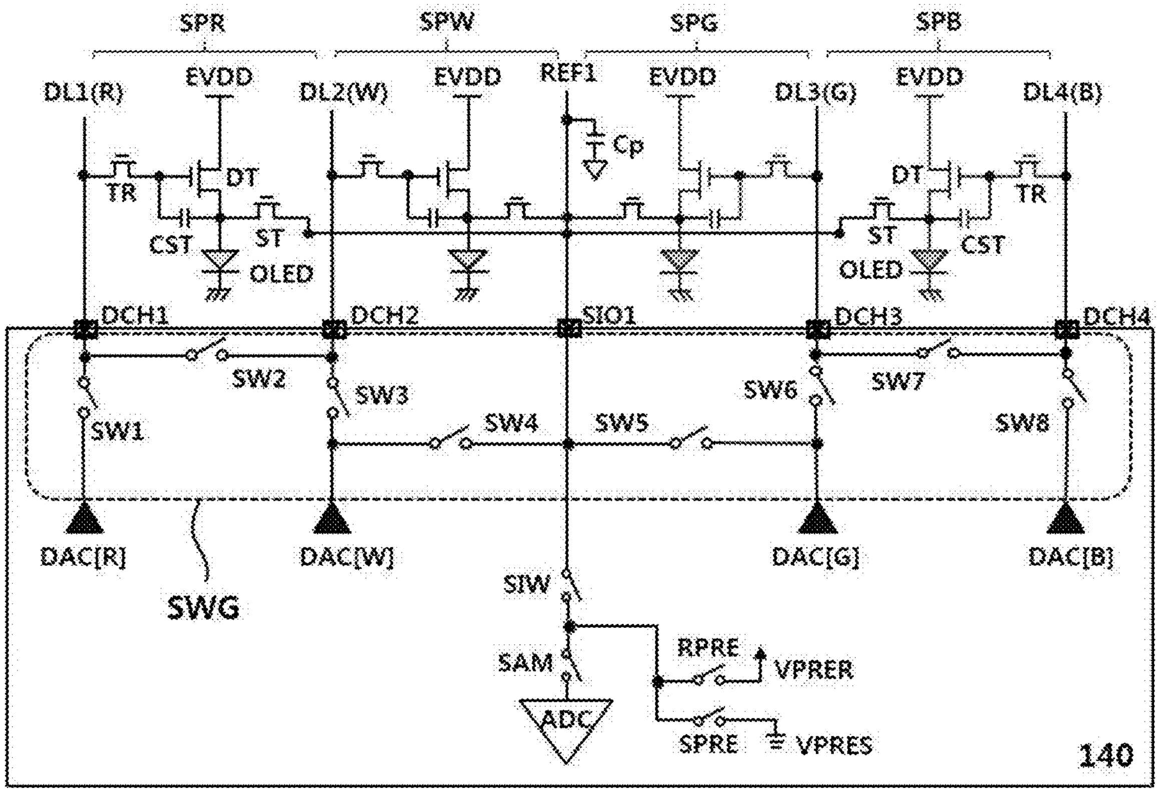
FIG. 32 is a circuit diagram of an LED device according to an eleventh embodiment of the present disclosure.

FIG. 32 is a circuit diagram of an LED device according to an eleventh embodiment of the present disclosure.

As shown in FIG. 32, the data driver 140 may include a switch group SWG including first to eighth switches SW1 to SW8. The switch group SWG may act to transfer a voltage output from one of the red data voltage output unit DAC[R], the white data voltage output unit DAC[W], the green data voltage output unit DAC[G] and the blue data voltage output unit DAC[B] to a channel thereof or another channel adjacent thereto.

In the eleventh embodiment of the present disclosure, because the pre-charge voltage output from one of the data voltage output units DAC[W] and DAC[G] is transferred to the first sensing channel SIO1, a total of eight switches SW1 to SW8 may constitute the switch group SWG.

The first switch SW1 may have a first electrode connected to an output terminal of the red data voltage output unit DAC[R], a second electrode connected to the first data channel DCH1, and a control electrode connected to a first switch control line to which a first switch control signal is transferred. The first switch SW1 may act to transfer a voltage output from the red data voltage output unit DAC[R] to the first data channel DCH1.

The second switch SW2 may have a first electrode connected to the first data channel DCH1, a second electrode connected to the second data channel DCH2, and a control electrode connected to a second switch control line to which a second switch control signal is transferred. The second switch SW2 may act to transfer a voltage output from the red data voltage output unit DAC[R] to the second data channel DCH2 or transfer a voltage output from the white data voltage output unit DAC[W] to the first data channel DCH1. That is, the second switch SW2 may act to help voltage sharing such that, when one (particularly, the white data voltage output unit DAC[W]) of the red data voltage output unit DAC[R] and the white data voltage output unit DAC [W] adjacent to each other is driven to output the pre-charge voltage, the other one (particularly, the red data voltage output unit DAC[R]) can apply a black data voltage or a sensing voltage instead.

The third switch SW3 may have a first electrode connected to an output terminal of the white data voltage output unit DAC[W], a second electrode connected to the second data channel DCH2, and a control electrode connected to a third switch control line to which a third switch control signal is transferred. The third switch SW3 may act to transfer a voltage output from the white data voltage output unit DAC[W] to the second data channel DCH2.

The fourth switch SW4 may have a first electrode connected to the output terminal of the white data voltage output unit DAC[W], a second electrode connected to the first sensing channel SIO1, and a control electrode connected to a fourth switch control line to which a fourth switch control signal is transferred. The fourth switch SW4 may act to transfer a voltage output from the white data voltage output unit DAC[W] to the first sensing channel SIO1.

The fifth switch SW5 may have a first electrode connected to an output terminal of the green data voltage output unit DAC[G], a second electrode connected to the first sensing channel SIO1, and a control electrode connected to a fifth switch control line to which a fifth switch control signal is transferred. The fifth switch SW5 may act to transfer a voltage output from the green data voltage output unit DAC[G] to the first sensing channel SIO1.

The sixth switch SW6 may have a first electrode connected to the output terminal of the green data voltage output unit DAC[G], a second electrode connected to the third data channel DCH3, and a control electrode connected to a sixth switch control line to which a sixth switch control signal is transferred. The sixth switch SW6 may act to transfer a voltage output from the green data voltage output unit DAC[G] to the third data channel DCH3.

The seventh switch SW7 may have a first electrode connected to the third data channel DCH3, a second electrode connected to the fourth data channel DCH4, and a control electrode connected to a seventh switch control line to which a seventh switch control signal is transferred. The seventh switch SW7 may act to transfer a voltage output from the green data voltage output unit DAC[G] to the fourth data channel DCH4 or transfer a voltage output from the blue data voltage output unit DAC[B] to the third data channel DCH3.

The eighth switch SW8 may have a first electrode connected to an output terminal of the blue data voltage output unit DAC[B], a second electrode connected to the fourth data channel DCH4, and a control electrode connected to an eighth switch control line to which an eighth switch control signal is transferred. The eighth switch SW8 may act to transfer a voltage output from the blue data voltage output unit DAC[B] to the fourth data channel DCH4.

As stated above, the eleventh embodiment may also use, as the pre-charge voltage, the voltage output from one of the white data voltage output unit DAC[W] and the green data voltage output unit DAC[G] instead of the reference voltage applied from the external voltage source or the internal voltage source. As a result, it may be possible to shorten the sensing time for sensing of the sub-pixel.

Figure 33:
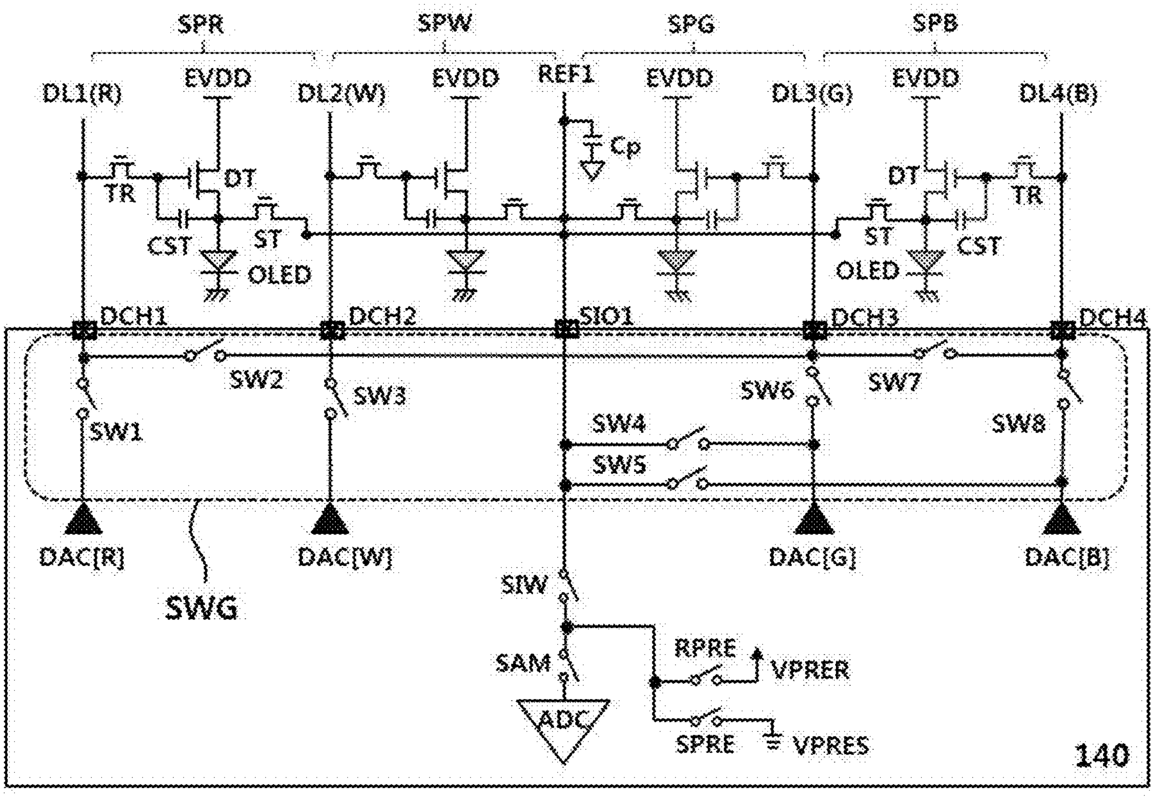
FIG. 33 is a circuit diagram of an LED device according to a twelfth embodiment of the present disclosure.

FIG. 33 is a circuit diagram of an LED device according to a twelfth embodiment of the present disclosure.

As shown in FIG. 33, the data driver 140 may include a switch group SWG including first to eighth switches SW1 to SW8. The switch group SWG may act to transfer a voltage output from one of the red data voltage output unit DAC[R], the white data voltage output unit DAC[W], the green data voltage output unit DAC[G] and the blue data voltage output unit DAC[B] to a channel thereof or another channel adjacent thereto.

In the twelfth embodiment of the present invention, because the pre-charge voltage output from one of the data voltage output units DAC[G] and DAC[B] is transferred to the first sensing channel SIO1, a total of eight switches SW1 to SW8 may constitute the switch group SWG.

The first switch SW1 may have a first electrode connected to an output terminal of the red data voltage output unit DAC[R], a second electrode connected to the first data channel DCH1, and a control electrode connected to a first switch control line to which a first switch control signal is transferred. The first switch SW1 may act to transfer a voltage output from the red data voltage output unit DAC[R] to the first data channel DCH1.

The second switch SW2 may have a first electrode connected to the first data channel DCH1, a second electrode connected to the third data channel DCH3, and a control electrode connected to a second switch control line to which a second switch control signal is transferred. The second switch SW2 may act to transfer a voltage output from the red data voltage output unit DAC[R] to the third data channel DCH3 or transfer a voltage output from the green data voltage output unit DAC[G] to the first data channel DCH1. That is, the second switch SW2 may act to help voltage sharing such that, when one of the red data voltage output unit DAC[R] and the green data voltage output unit DAC[G] spaced apart from each other is driven to output the pre-charge voltage, the other one can apply a black data voltage or a sensing voltage instead.

The third switch SW3 may have a first electrode connected to an output terminal of the white data voltage output unit DAC[W], a second electrode connected to the second data channel DCH2, and a control electrode connected to a third switch control line to which a third switch control signal is transferred. The third switch SW3 may act to transfer a voltage output from the white data voltage output unit DAC[W] to the second data channel DCH2.

The fourth switch SW4 may have a first electrode connected to an output terminal of the green data voltage output unit DAC[G], a second electrode connected to the first sensing channel SIO1, and a control electrode connected to a fourth switch control line to which a fourth switch control signal is transferred. The fourth switch SW4 may act to transfer a voltage output from the green data voltage output unit DAC[G] to the first sensing channel SIO1.

The fifth switch SW5 may have a first electrode connected to an output terminal of the blue data voltage output unit DAC[B], a second electrode connected to the first sensing channel SIO1, and a control electrode connected to a fifth switch control line to which a fifth switch control signal is transferred. The fifth switch SW5 may act to transfer a voltage output from the blue data voltage output unit DAC [B] to the first sensing channel SIO1.

The sixth switch SW6 may have a first electrode connected to the output terminal of the green data voltage output unit DAC[G], a second electrode connected to the third data channel DCH3, and a control electrode connected to a sixth switch control line to which a sixth switch control signal is transferred. The sixth switch SW6 may act to transfer a voltage output from the green data voltage output unit DAC[G] to the third data channel DCH3.

The seventh switch SW7 may have a first electrode connected to the third data channel DCH3, a second electrode connected to the fourth data channel DCH4, and a control electrode connected to a seventh switch control line to which a seventh switch control signal is transferred. The seventh switch SW7 may act to transfer a voltage output from the green data voltage output unit DAC[G] to the fourth data channel DCH4 or transfer a voltage output from the blue data voltage output unit DAC[B] to the third data channel DCH3.

The eighth switch SW8 may have a first electrode connected to the output terminal of the blue data voltage output unit DAC[B], a second electrode connected to the fourth data channel DCH4, and a control electrode connected to an eighth switch control line to which an eighth switch control signal is transferred. The eighth switch SW8 may act to transfer a voltage output from the blue data voltage output unit DAC[B] to the fourth data channel DCH4.

As stated above, the twelfth embodiment may also use, as the pre-charge voltage, the voltage output from one of the green data voltage output unit DAC[G] and the blue data voltage output unit DAC[B] instead of the reference voltage applied from the external voltage source or the internal voltage source. As a result, it may be possible to shorten the sensing time for sensing of the sub-pixel.

Hereinafter, a description will be given of an embodiment associated with a method capable of shortening the sensing time when implementing the above-described first to twelfth embodiments.

Figure 34:
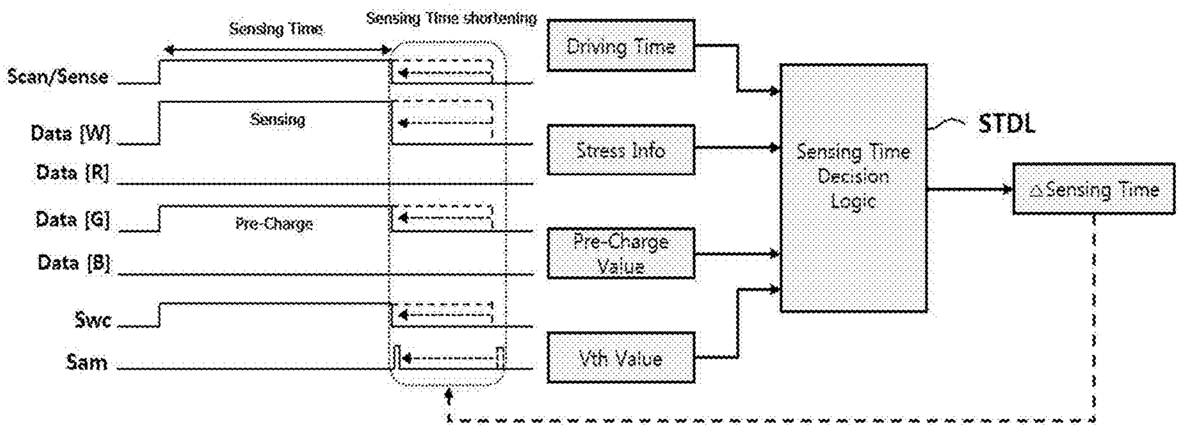
FIG. 34 is a block diagram of an LED device according to a thirteenth embodiment of the present disclosure.
Figure 35:
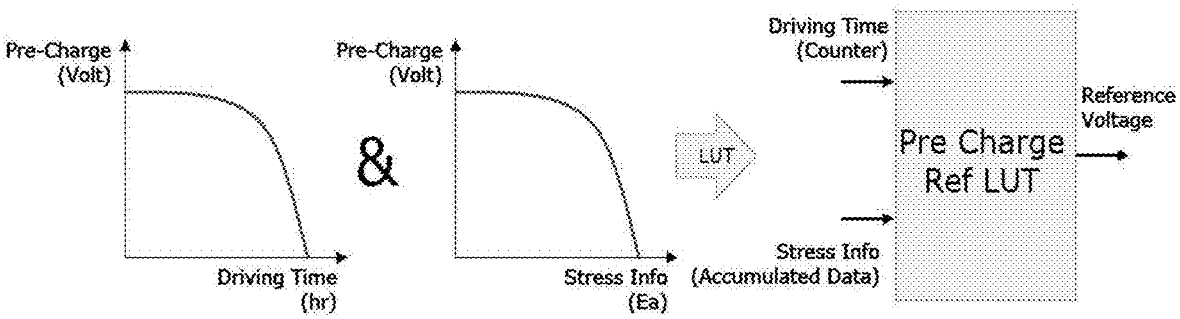
FIGS. 35 and 36 are views illustrating a part associated with setting of a pre-charge voltage.
Figure 36:
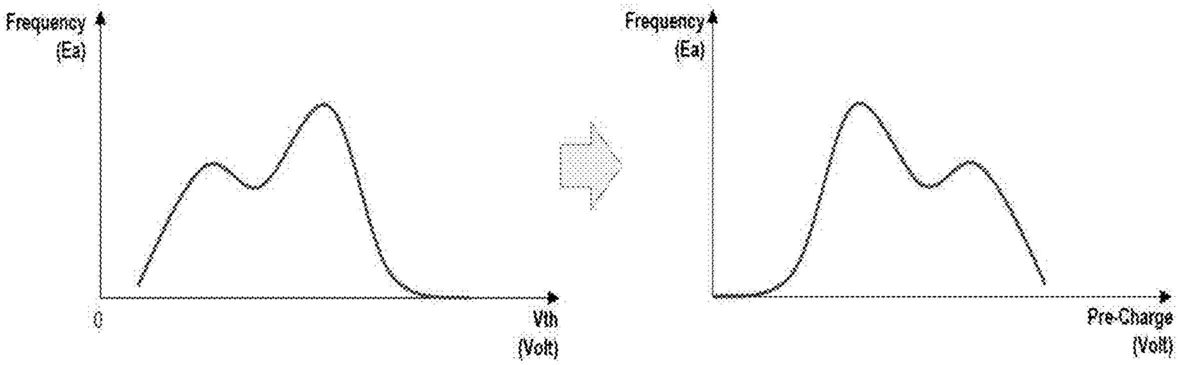

FIG. 34 is a block diagram of an LED device according to a thirteenth embodiment of the present disclosure, and FIGS. 35 and 36 are views illustrating a part associated with setting of the pre-charge voltage.

As shown in FIGS. 34 to 36, the LED device may include a logic circuit STDL which decides and controls the sensing time. The logic circuit STDL may be integrated into a circuit in which a logic circuit is embedded, like the timing controller.

The logic circuit STDL may provide a sensing time variable value ΔSensing Time capable of varying control conditions of various devices performed for the sensing time based on a driving time Driving Time, stress information Stress Info, a pre-charge voltage value Pre-Charge Value, and a threshold voltage value Vth Value.

The device control conditions may include control conditions of the data voltage output units which output the white data voltage Data[W], the red data voltage Data[R], the green data voltage Data[G], and the blue data voltage Data[B], control conditions of the sampling signal Sam for control of the sampling circuit SAM, and control conditions of the switch control signal Swc for control of the switch group.

The driving time Driving Time may be defined as a driving time of the entire display panel or a sub-pixel-unit driving time. The stress information Stress Info may be stress information which may be induced when a device is driven, and may include stress that at least one of the display panel, the data driver, the scan driver or the power supply may receive.

The pre-charge voltage value Pre-Charge Value may include an average of the pre-charge voltages applied to the entire display panel, individual values of the pre-charge voltages applied in units of sub-pixels, a previously used pre-charge voltage value, and a currently used pre-charge voltage value. The threshold voltage value Vth Value may include a previous threshold voltage value and a current threshold voltage value of the driving transistor included in the sub-pixel, and a previous threshold voltage value and a current threshold voltage value of the organic light emitting diode included in the sub-pixel.

As a first example, the pre-charge voltage value Pre-Charge Value may be set or varied based on a reference voltage output from a look-up table Pre Charge Ref LUT. Data in the look-up table Pre Charge Ref LUT may be provided based on the driving time Driving Time and the stress information Stress Info.

The driving time Driving Time may be provided based on a counter capable of counting the driving time of the display panel, and the stress information Stress Info may be provided based on an accumulated data signal Accumulated Data applied to the display panel, but are not limited thereto.

As a second example, the pre-charge voltage value Pre-Charge Value may be provided based on a varied value of a threshold voltage Vth based on the frequency of use of the device included in the sub-pixel. The pre-charge voltage value Pre-Charge Value may have a different voltage level according to a variation in the threshold voltage Vth based on the frequency of use of the device. The varied value of the threshold voltage Vth based on the frequency of use of the device may be based on an experimental value or a simulation value.

According to the above-stated method, the control conditions (particularly, the pre-charge voltage) of various devices may be varied based on various information which can be considered during driving of the LED device, so that it may be expected to shorten not only the sensing time of the display panel but also the compensation time thereof.

As is apparent from the above description, according to the present disclosure, a voltage output from one of data voltage output units instead of a reference voltage applied from an external voltage source or an internal voltage source may be used as a pre-charge voltage, thereby reducing time of source following performed during sensing. Further, it may be expected to shorten not only a sensing time of a display panel but also a compensation time thereof based on reduction in time of source following performed during sensing. In addition, control conditions (particularly, the pre-charge voltage) of various devices may be varied based on various information which can be considered during driving of a display device.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A light emitting display device comprising:

a display panel configured to display an image; and a data driver comprising a panel driving circuit and a panel sensing circuit, the panel driving circuit including a plurality of data voltage output circuits configured to drive the display panel, and the panel sensing circuit configured to sense the display panel through a reference line, wherein a first data voltage output circuit from the plurality of data voltage output circuits outputs a pre-charge voltage to the reference line to pre-charge, wherein the data driver further comprises at least one switch configured to transfer a voltage output from a second data voltage output circuit from the plurality of data voltage output circuits to a data channel corresponding to a first data voltage output circuit from the plurality of data voltage output circuits while the first data voltage output circuit outputs the pre-charge voltage to the reference line, and wherein the pre-charge voltage charged on the reference line of the display panel is applied to a sensing node of a sub-pixel to be sensed.

2. The light emitting display device according to claim 1, wherein each of the plurality of data voltage output circuits is connected to a corresponding one sub-pixel from a plurality of sub-pixels, a corresponding one data line from a plurality of data lines, and a corresponding one data channel from a plurality of data channels of the data driver, the corresponding one data channel connecting each data voltage output circuit to the corresponding data line, wherein the plurality of sub-pixels corresponding to the plurality of data voltage output circuits are all connected to the reference line.

3. The light emitting display device according to claim 2, wherein, when a voltage output from a first data voltage output circuit among the plurality of data voltage output circuits is used as the pre-charge voltage, a voltage output from a second data voltage output circuit among the plurality of data voltage output circuits is output through a data channel corresponding to the first data voltage output circuit.

4. The light emitting display device according to claim 3, wherein the second data voltage output circuit is adjacent to or spaced apart from the first data voltage output circuit.

5. The light emitting display device according to claim 3, wherein the voltage output from the second data voltage output circuit is also output through a data channel corresponding to the second data voltage output circuit.

6. The light emitting display device according to claim 3, wherein a third data voltage output circuit among the plurality of data voltage output circuits outputs a sensing voltage through a data channel corresponding to the third data voltage output circuit.

7. The light emitting display device according to claim 2, wherein the data driver further comprises a plurality of switches each configured to transfer a voltage output from one of the plurality of data voltage output circuits to a corresponding data channel or transfer a voltage output from another one of the plurality of data voltage output circuits to a sensing channel connected to the reference line during sensing of the display panel.

8. The light emitting display device according to claim 2, wherein at least two data channels among a plurality of data channels corresponding to the plurality of data voltage output circuits are connected to each other via one switch, and at least one of at least two data voltage output circuits corresponding to the at least two data channels is connected to the reference line via one switch.

9. The light emitting display device according to claim 2, wherein at least two pairs of data channels among a plurality of data channels corresponding to the plurality of data voltage output circuits are connected to each other via one switch, and at least one data voltage output circuit of at least two pairs of data voltage output circuits corresponding to the at least two pairs of data channels is connected to the reference line via one switch.

10. The light emitting display device according to claim 1, wherein each of the plurality of data voltage output circuits outputs a data voltage to a corresponding one data line from a plurality of data lines when the display panel is driven, and outputs at least one of a sensing voltage, a black data voltage, or a pre-charge voltage when the display panel is sensed.

11. The light emitting display device according to claim 10, wherein the sensing voltage and the black data voltage are output to a data line, and the pre-charge voltage is output to the reference line.

12. The light emitting display device according to claim 10, wherein the data driver further comprises:

a voltage output switch configured to perform a switching operation to output the data voltage, the sensing voltage, or the black data voltage through a data channel corresponding to the voltage output switch, a voltage sharing switch configured to perform a switching operation to transfer the black data voltage to another data channel different from the data channel corresponding to a data voltage output circuit that outputted the black data voltage, and a pre-charging switch configured to perform a switching operation to output the pre-charge voltage through a sensing channel connected to the reference line.

13. The light emitting display device according to claim 12, wherein:

the voltage output switch includes a first electrode connected to an output terminal of a corresponding one of the plurality of data voltage output circuits and a second electrode connected to the data channel corresponding to the corresponding data voltage output circuit, the voltage output switch operating in response to a first signal applied to a control electrode of the voltage output switch, the voltage sharing switch includes a first electrode connected to the data channel corresponding to the data voltage output circuit outputting the black data voltage and a second electrode connected to the other data channel, the voltage sharing switch operating in response to a second signal applied to a control electrode of the voltage sharing switch, and the pre-charging switch includes a first electrode connected to a corresponding data voltage output circuit and a second electrode connected to the sensing channel, the pre-charging switch operating in response to a third signal applied to a control electrode of the pre-charging switch.

14. The light emitting display device according to claim 10, wherein the pre-charge voltage is varied based on at least one of a driving time of the device, stress information, a pre-charge voltage value, or a threshold voltage value.

15. The light emitting display device according to claim 1, wherein the data driver further comprises at least one switch configured to transfer a voltage output from one of the plurality of data voltage output circuits to a sensing channel connected to the reference line.

16. A method of driving the light emitting display device of claim 1, the light emitting display device comprising the display panel configured to display the image, and the data driver having the panel driving circuit configured to drive the display panel, and the panel sensing circuit configured to sense the display panel, the method comprising:

applying a sensing voltage to a data line of a sub-pixel of a plurality of subpixels to be sensed and a black data voltage to a data line of a sub-pixel of the plurality of subpixels that is not to be sensed to sense the display panel; and applying a pre-charge voltage to a reference line of the sub-pixel to be sensed, wherein the pre-charge voltage is a voltage output from one of a plurality of data voltage output circuits included in the panel driving circuit.

17. The method according to claim 16, wherein the pre-charge voltage is varied based on at least one of a driving time of the device, stress information, a pre-charge voltage value, or a threshold voltage value.

18. A light emitting display device comprising:

a display panel configured to display an image, the display panel including a plurality of sub-pixels, a reference line connected to the plurality of sub-pixels, and a plurality of data lines, each of the plurality of data lines connected to a corresponding one of the plurality of sub-pixels; and a data driver comprising a plurality of data voltage output circuits configured to drive the display panel via the plurality of data lines and a panel sensing circuit configured to sense the display panel through the reference line, each of the plurality of data voltage output circuits connected to a corresponding one of the data lines, wherein a first data voltage output circuit from the plurality of data voltage output circuits is configured to output a sensing voltage to a first data line connected to a first sub-pixel from the plurality of sub-pixels that corresponds to the first data voltage output circuit, and a second data voltage output circuit from the plurality of data voltage output circuits is configured to output a pre-charge voltage to the reference line that is applied to a sensing node of the first sub-pixel while the sensing voltage is applied to the first sub-pixel.

* * * * *